United States Patent
Moriguchi et al.

(10) Patent No.: US 8,731,829 B2
(45) Date of Patent: May 20, 2014

(54) FLOW LINE DETECTION SYSTEM, FLOW LINE DETECTION METHOD, AND FLOW LINE DETECTION PROGRAM

(75) Inventors: Yukie Moriguchi, Tokyo (JP); Yuusuke Konishi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/695,489

(22) PCT Filed: May 26, 2011

(86) PCT No.: PCT/JP2011/002930
§ 371 (c)(1),
(2), (4) Date: Oct. 31, 2012

(87) PCT Pub. No.: WO2011/151999
PCT Pub. Date: Dec. 8, 2011

(65) Prior Publication Data
US 2013/0054142 A1    Feb. 28, 2013

(30) Foreign Application Priority Data

May 31, 2010   (JP) ................................ 2010-125079

(51) Int. Cl.
*G01C 7/00*    (2006.01)

(52) U.S. Cl.
USPC .......................................... 701/519; 701/214

(58) Field of Classification Search
USPC .......... 701/519, 207, 214, 408; 382/103, 113; 348/169
See application file for complete search history.

(56) References Cited

U.S. PATENT DOCUMENTS

| | | | |
|---|---|---|---|
| 6,567,116 B1* | 5/2003 | Aman et al. | 348/169 |
| 8,224,685 B2* | 7/2012 | Sekine et al. | 705/7.29 |
| 2001/0012379 A1* | 8/2001 | Amemiya et al. | 382/103 |
| 2003/0009364 A1* | 1/2003 | Miyoshi et al. | 705/7 |
| 2008/0130948 A1* | 6/2008 | Ozer | 382/103 |

(Continued)

FOREIGN PATENT DOCUMENTS

| | | |
|---|---|---|
| JP | 2005-031955 A | 2/2005 |
| JP | 2005-250989 A | 9/2005 |

(Continued)

OTHER PUBLICATIONS

Yukie Moriguchi et al., "Robust Human Trajectory Detection Method Against Sensor Data Discontinuity Using Sensor Fusion", Dai 72 Kai (Heisei 22 Nen) Zenkoku Taikai Koen Ronbunshu, Mar. 8, 2010, pp. 3.89-3.90.

(Continued)

*Primary Examiner* — Mary Cheung
*Assistant Examiner* — Rodney Butler
(74) *Attorney, Agent, or Firm* — Sughrue Mion, PLLC

(57) ABSTRACT

A flow line specification unit selects, for each piece of mobile object identification information, position-score correspondence information that satisfies a criterion from among position-score correspondence information stored in state storage unit, as definite position-score correspondence information. The flow line specification unit repeatedly performs a process of reflecting the definite position-score correspondence information in position-score correspondence information of a time nearest a time corresponding to the definite position-score correspondence information and setting the position-score correspondence information of the nearest time as definite position-score correspondence information. And the flow line specification unit specifies a flow line of a mobile object from a score in position-score correspondence information of each time.

8 Claims, 21 Drawing Sheets

(56) References Cited

U.S. PATENT DOCUMENTS

| | | | |
|---|---|---|---|
| 2009/0092282 A1* | 4/2009 | Avidan et al. | 382/103 |
| 2009/0125231 A1* | 5/2009 | Ichimura | 701/207 |
| 2009/0189984 A1* | 7/2009 | Yamazaki | 348/161 |
| 2009/0257624 A1* | 10/2009 | Ikumi et al. | 382/113 |
| 2011/0080336 A1* | 4/2011 | Leyvand et al. | 345/156 |
| 2011/0181720 A1* | 7/2011 | Edgeworth et al. | 348/144 |
| 2011/0221890 A1* | 9/2011 | Yamashita | 348/135 |

FOREIGN PATENT DOCUMENTS

| | | |
|---|---|---|
| JP | 2006-146378 A | 6/2006 |
| JP | 2008-014742 A | 1/2008 |
| JP | 2008-014743 A | 1/2008 |
| JP | 2008-122093 A | 5/2008 |
| JP | 2008-175786 A | 7/2008 |
| JP | 2009-176031 A | 8/2009 |

OTHER PUBLICATIONS

Extended European Search Report dated Mar. 6, 2014, issued by the European Patent Office in corresponding European Application No. 11789413.9.

Takayuki Kanda et al., "Analysis of People Trajectories with Ubiquitous Sensors in a Science Museum", 2007 IEEE International Conference on Robotics and Automation, Apr. 10, 2007, pp. 4846 to 4853, XP031389551, ISBN: 978-1-4244-0601-2.

* cited by examiner

71: CELL OF INTEREST

≡ : CELL OF INTEREST
▨ : SCORE PROPAGATION DESTINATION CELL (a) MOBILITY MODEL OF PROPAGATING SCORE TO UPPER, LOWER, LEFT, AND RIGHT CELLS

71: CELL OF INTEREST (b) MOBILITY MODEL OF PROPAGATING SCORE UP TO n-TH CELLS IN VERTICAL, HORIZONTAL, AND DIAGONAL DIRECTIONS (a) MOBILITY MODEL USING MOVING DIRECTION AND MOVING VELOCITY AS PARAMETERS (b) MOBILITY MODEL USING MOVING DIRECTION AND MOVING VELOCITY AS PARAMETERS

FIG. 11

| TIME | ID INFORMATION INPUT UNIT 2a | ID INFORMATION INPUT UNIT 2b |
|---|---|---|
| $t_1$ | ID1, ID2 | |
| $t_2$ | ID1, ID2 | |
| $t_3$ | | |
| $t_4$ | | |
| $t_5$ | | |
| $t_6$ | | |
| $t_7$ | | |
| $t_8$ | | |
| $t_9$ | | |
| $t_{10}$ | | ID1 |

(a) POSITION-SCORE CORRESPONDENCE INFORMATION OF ID1 AT TIME $t_9$ (b) POSITION-SCORE CORRESPONDENCE INFORMATION OF ID2 AT TIME $t_9$ (a) AFTER SCORE PROPAGATION BY STATE ESTIMATION MEANS 321 (ID1)

(b) AFTER SCORE PROPAGATION BY STATE ESTIMATION MEANS 321 (ID2)

(a) REFLECT ID INFORMATION IN ESTIMATION OF SCORE AT TIME $t_{10}$ (ID1)

(b) REFLECT ID INFORMATION IN ESTIMATION OF SCORE AT TIME $t_{10}$ (ID2)

(a) REFLECT POSITION INFORMATION IN RESULT OF STEP S6 (ID1)

(b) REFLECT POSITION INFORMATION IN RESULT OF STEP S6 (ID2)

FLOW LINE DETECTION SYSTEM, FLOW LINE DETECTION METHOD, AND FLOW LINE DETECTION PROGRAM

CROSS REFERENCE TO RELATED APPLICATIONS

This application is a National Stage of International Application No. PCT/JP2011/002930 filed on May 26, 2011, which claims priority from Japanese Patent Application No. 2010-125079, filed on May 31, 2010, the contents of all of which are incorporated herein by reference in their entirety.

TECHNICAL FIELD

The present invention relates to a flow line detection system, a flow line detection method, and a flow line detection program for determining at which position a mobile object corresponding to which identification information exists in a tracking area, based on detection results of a position of a mobile object and identification information unique to the mobile object.

BACKGROUND ART

Typically, flow line detection of a mobile object such as a person or a thing is realized by associating a position of the mobile object with identification information (hereafter referred to as an ID) of the mobile object. Such association enables the mobile object to be uniquely identified and its flow line to be detected. Various techniques relating to flow line detection are proposed (for example, see Patent Literatures (PTLs) 1 and 2). Note that a flow line of a mobile object is information that, having individually identified the mobile object, indicates a path through which the mobile object moves. That is, the flow line is information indicating the moving path of the individually identified mobile object. A trajectory means a connection of position coordinates detected temporally continuously for a mobile object. Accordingly, the trajectory is interrupted when the position coordinate detection for the mobile object is interrupted.

A mobile object tracking system described in PTL 1 includes a monitoring camera for taking photographs in a space and an IC tag reader. The mobile object tracking system described in PTL 1 obtains a position coordinate of each mobile object based on the output of the monitoring camera, and manages first identification information (camera tracking ID) unique to the mobile object and the position coordinate of the mobile object in a tracking information table in association with each other. The mobile object tracking system also reads unique second identification information (object ID) from each mobile object having an IC tag, and manages the second identification information and a position coordinate of the tag in a reading information table in association with each other. The mobile object tracking system further manages the first identification information, the position information, and third identification information (position management ID) in a position management table in association with each other. The mobile object tracking system described in PTL 1 also includes, for each mobile object recognized at the same time within a predetermined error range, a position estimation table for managing the second identification information and the third identification information in association with each other, and tracks each mobile object according to the position management table and the position estimation table. In detail, in the case where the position of the mobile object detected by the monitoring camera at a given time and the position at which the IC tag reader detects the object ID are within a predetermined error range, the position information of the mobile object at the given time and the object ID are managed in association with each other, in the position management table and the position estimation table. According to this structure, the mobile object tracking system described in PTL 1 tracks the mobile object by integrating detection results obtained by a plurality of sensors.

That is, the mobile object tracking system described in PTL 1 determines a mobile object recognized by first identification means (means using the camera) and a mobile object recognized by second identification means (means using the IC tag) as the same mobile object if their recognition times and recognition positions substantially match, and integrates the information obtained by the first and second identification means. This enables flow line detection for the mobile object based on position information obtained by a plurality of sensors having different detection mechanisms.

A monitoring system using a plurality of cameras described in PTL 2 has the plurality of cameras installed in a space to be monitored, and includes feature value extraction means for extracting each mobile object and its feature value information from an image of any camera through the use of an image recognition technology. The image captured by the camera and the feature value information of the mobile object are sent to mobile object comparison and tracking means via a communication network. The comparison and tracking means has, at its center, a monitor space database in which the entire space to be monitored is expressed as a three-dimensional model and also a connection of spaces where mobile objects are movable is expressed as a network, and accumulates the received feature value information. Since a plurality of mobile objects are usually present in one camera image, these mobile objects are separated each as an individual mobile object. To track separated/aggregated mobile objects, path calculation means in the comparison and tracking means calculates moving path candidates between camera photography ranges in the space to be monitored. Mobile object consistency degree calculation means in the comparison and tracking means then calculates a consistency degree between feature value sets of two mobile objects, and determines whether or not the two mobile objects match using the consistency degree. The comparison and tracking means includes personal identification information matching means for card authentication, biometric authentication, or the like installed at a door. The vicinity of the door equipped with the card authentication means is photographed by a monitoring camera to extract feature value information of an appearance, and at the same time the feature value information is associated with information of an owner by card information.

That is, the monitoring system using the plurality of cameras described in PTL 2 connects detected mobile object trajectories between monitor areas, and also associates trajectories with personal identification information by the personal identification information matching means for card authentication, biometric authentication, or the like, as a result of which flow lines with personal identification information can be created.

The monitoring system described in PTL 2 uses luminance values of human upper and lower bodies or the like, as feature values.

An image processing device capable of tracking each mobile object appearing on a video image even in the case where an occlusion occurs is described in PTL 3. The image processing device described in PTL 3 tracks each of a plurality of feature points from a previous frame to a current frame, and estimates motion of a tracking area based on the tracking result of each feature point, to specify a position of the tracking area in the current frame. The image processing device further calculates, for each feature point, reliability indicating a level of possibility that the feature point exists in the mobile object, and calculates the motion of the tracking area using the reliability. For example, the number of frames (history) in which tracking is continuously successful is used as the reliability.

CITATION LIST

Patent Literature(s)

PTL 1: Japanese Patent Application Laid-Open No. 2005-31955 (paragraphs 0008, 0009)
PTL 2: Japanese Patent Application Laid-Open No. 2006-146378 (paragraphs 0007 to 0017, 0024)
PTL 3: Japanese Patent Application Laid-Open No. 2005-250989 (paragraphs 0010, 0016, 0017, 0074, 0075)

SUMMARY OF INVENTION

Technical Problem

Typically, in a mobile object tracking system using a camera, a mobile object can be tracked but cannot be uniquely identified. By installing an ID detection device capable of detecting a unique ID of a mobile object, such as a card authenticator, a biometric authenticator, or an MD (Radio Frequency Identification) reader, at each place in a tracking area, whether or not the unique ID of the mobile object passes through the vicinity of the ID detection device can be determined. However, no unique ID can be detected for a mobile object located away from the ID detection device, and so the position of the mobile object cannot be recognized.

In the systems described in PTLs 1 and 2, a camera and a plurality of sensors are combined to realize flow line detection for a mobile object.

However, there is a possibility that tracking is interrupted when, for example, a plurality of mobile objects overlap at the same place or a mobile object moves from one camera view to another camera view.

The system described in PTL 1 can detect a flow line in the case where an ID can be detected by a sensor. If tracking is frequently interrupted, however, the accuracy of flow line detection decreases because the flow line detection process is resumed from sensor information newly obtained again. For example, suppose a mobile object A exists in a tracking area, and a trajectory 1 is detected from the mobile object A. In the case where the trajectory 1 passes within an ID detection area and an ID detection device detects an ID (denoted by IDa), IDa can be associated with the trajectory 1. Suppose the detection of the trajectory 1 is interrupted here, and a trajectory 2 is detected from the mobile object A at a next time. The system described in PTL 1 resumes the flow line detection process of the mobile object A using only the trajectory 2 newly obtained again. However, since the trajectory 2 does not pass within the ID detection area, there is no ID associated with the trajectory 2. Thus, each time a tracking or ID interruption occurs, the previously obtained sensor information (the trajectory 1 and IDa in the above-mentioned example) can no longer be used, and the flow line detection is resumed based only on the sensor information (the trajectory 2 in the above-mentioned example) newly obtained again after the trajectory is interrupted. Therefore, the obtained trajectory and ID cannot be accurately associated with each other.

Besides, the ID is detected in a limited situation such as when the mobile object exists in the area where the sensor is capable of detecting a wireless tag or the like. In other words, the ID cannot be obtained frequently. This means that, in the case where tracking is frequently interrupted, an increased number of trajectories are unable to be associated with the mobile object ID. There is also a possibility that a trajectory of an object not to be tracked is detected. Such a trajectory causes noise, which is another factor responsible for an increased number of trajectories which are unable to be associated with the ID.

That is, in a flow line detection method that uses only sensor information which can be continuously detected up to the current time, if tracking or ID obtainment is frequently interrupted, the accuracy of flow line detection decreases because the flow line detection process is resumed from sensor information newly obtained again.

In view of this, there is a method in which, by calculating a consistency degree between a currently detected trajectory and a previously detected trajectory group and connecting trajectories, an ID obtained by card authentication, biometric authentication, or the like and associated with only a trajectory is associated with the connected other trajectories, as in PTL 2.

In this method, however, the timing of connecting trajectories is significant. For instance, in the case where a mobile object appears in a tracking area A, a consistency degree between a trajectory of the mobile object and a trajectory group previously detected in adjacent tracking areas B and C is calculated, and a combination of trajectories is connected based on the consistency degree. In the monitoring system described in PTL 2, for example, luminance values of upper and lower bodies of a mobile object obtained from a camera are used as feature values of a trajectory, and a degree of matching in feature value between two trajectories subjected to connection is used as the consistency degree. The feature value of the mobile object is detected accurately in the case where the position or size of the mobile object satisfies a predetermined condition in the camera's angle of view, but can contain an error otherwise. This incurs a possibility that, in the case of performing the trajectory connection process at an early stage, the consistency degree is calculated in a state where the feature value of the trajectory cannot be obtained accurately, making proper trajectory connection impossible.

For accurate trajectory connection, there is a method in which, instead of calculating the consistency degree only once, the consistency degree between trajectories is calculated using the most recent feature value at regular time intervals, to sequentially update the connection result. In this case, however, many trajectory groups as connection candidates for a trajectory are selected and their consistency degrees are calculated at regular time intervals. When the number of people to be monitored or the number of tracking areas increases, the number of trajectory combinations as connection candidates increases. This makes it practically difficult to perform the flow line detection process in real time.

That is, in a flow line detection method that uses a combination of sensor information detected during a past predetermined period from the current time, there is a need to calculate the consistency degree for all combinations of each trajectory detected at the current time and each trajectory detected in the past. When the number of people to be tracked or the number of tracking areas increases, the number of trajectory combinations as connection candidates increases. This makes real-time processing difficult.

In the image processing device described in PTL 3, for example, the number of frames in which tracking is continuously successful is used as reliability of a feature point, and motion of a tracking area is calculated using the reliability. This reliability may be applied to a system for calculating a flow line by detecting information such as a position and an ID of a mobile object. However, since the same amount of sensor information is not necessarily obtained at each time, even when an index value indicating a possibility of existence of a mobile object is calculated, the index value varies in accuracy according to time, and so an accurate flow line may not be able to be calculated.

In view of the above, the present invention has an object of providing a flow line detection system, a flow line detection method, and a flow line detection program capable of accurately determining a position of a mobile object of each piece of identification information and detecting a flow line even when there are frequent cases where a position or identification information of a mobile object cannot be detected.

Solution to Problem

A flow line detection system according to the present invention comprises: position-score correspondence information creation means for creating position-score correspondence information for each piece of mobile object identification information, the position-score correspondence information being information in which a score indicating a level of possibility that a mobile object having a unique piece of identification information exists is set for each position in a tracking area of the mobile object; state storage means for storing position-score correspondence information of each time; and flow line specification means for: selecting, for each piece of mobile object identification information, position-score correspondence information that satisfies a predetermined criterion from among the position-score correspondence information stored in the state storage means, as definite position-score correspondence information; repeatedly performing a process of reflecting the definite position-score correspondence information in position-score correspondence information of a time nearest a time corresponding to the definite position-score correspondence information and setting the position-score correspondence information of the nearest time as definite position-score correspondence information; and specifying a flow line of a mobile object from a score in position-score correspondence information of each time.

A flow line detection method according to the present invention comprises: creating position-score correspondence information for each piece of mobile object identification information, the position-score correspondence information being information in which a score indicating a level of possibility that a mobile object having a unique piece of identification information exists is set for each position in a tracking area of the mobile object; storing position-score correspondence information of each time in state storage means; and selecting, for each piece of mobile object identification information, position-score correspondence information that satisfies a predetermined criterion from among the position-score correspondence information stored in the state storage means as definite position-score correspondence information, repeatedly performing a process of reflecting the definite position-score correspondence information in position-score correspondence information of a time nearest a time corresponding to the definite position-score correspondence information and setting the position-score correspondence information of the nearest time as definite position-score correspondence information, and specifying a flow line of a mobile object from a score in position-score correspondence information of each time.

A flow line detection program according to the present invention causes a computer to execute: a position-score correspondence information creation process of creating position-score correspondence information for each piece of mobile object identification information, the position-score correspondence information being information in which a score indicating a level of possibility that a mobile object having a unique piece of identification information exists is set for each position in a tracking area of the mobile object; a state storage process of storing position-score correspondence information of each time in state storage means; and a flow line specification process of: selecting, for each piece of mobile object identification information, position-score correspondence information that satisfies a predetermined criterion from among the position-score correspondence information stored in the state storage means, as definite position-score correspondence information; repeatedly performing a process of reflecting the definite position-score correspondence information in position-score correspondence information of a time nearest a time corresponding to the definite position-score correspondence information and setting the position-score correspondence information of the nearest time as definite position-score correspondence information; and specifying a flow line of a mobile object from a score in position-score correspondence information of each time.

Advantageous Effects of Invention

According to the present invention, it is possible to accurately determine a position of a mobile object of each piece of identification information and detect a flow line even when there are frequent cases where a position or identification information of a mobile object cannot be detected.

BRIEF DESCRIPTION OF DRAWINGS

FIG. 11 is an explanatory diagram showing an example of ID detection of each ID information input unit.

DESCRIPTION OF EMBODIMENT(S)

The following describes exemplary embodiments of the present invention with reference to drawings.

Exemplary Embodiment 1

Figure 1:
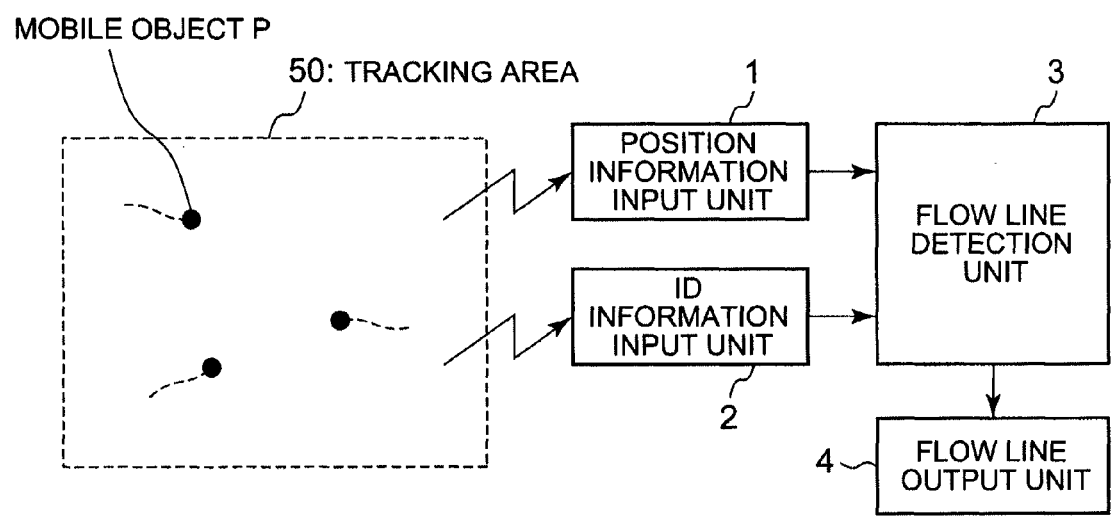
FIG. 1 is a block diagram showing an example of a flow line detection system in Exemplary Embodiment 1 of the present invention.

FIG. 1 is a block diagram showing an example of a flow line detection system in Exemplary Embodiment 1 of the present invention. The flow line detection system according to the present invention includes a position information input unit 1, an ID information input unit 2, a flow line detection unit 3, and a flow line output unit 4. The flow line detection system according to the present invention acquires a position and an ID (identification information) of a mobile object and, for each position in a predetermined tracking area 50, derives a score indicating a level of possibility that the mobile object exists. The score is calculated for each mobile object ID. Based on a score at a time when a predetermined criterion is satisfied, the flow line detection system according to the present invention modifies a score at a time nearest the time, and further modifies a score at a time nearest the time of the modified score, in sequence. The flow line detection system according to the present invention specifies a flow line of the mobile object using the modified scores.

Each mobile object P freely moves in the tracking area 50. Each mobile object P may move out of the tracking area 50. The type of mobile object is not particularly limited, and may be any of a person, an animal, and a thing.

The position information input unit 1 is a device for detecting a position coordinate of a mobile object in the tracking area 50, and inputting the position coordinate and a detection time to the flow line detection unit 3. In the following description, the case of detecting a two-dimensional coordinate value as a position is taken as an example. The position information input unit 1 inputs a combination of the two-dimensional position coordinate of the mobile object in the tracking area 50 and the detection time of the position coordinate, to the flow line detection unit 3. The combination of the position coordinate of the mobile object detected by the position information input unit 1 and the detection time of the position coordinate is hereafter referred to as position information.

The position information input unit 1 may be any device capable of detecting the position coordinate of the mobile object in the tracking area 50 and specifying the detection time. The position information input unit 1 does not need to detect an ID unique to each individual mobile object. For example, the position information input unit 1 may be realized by a mobile object tracking system using a camera, a floor pressure sensor, a laser rangefinder, or radar. In the case where the position information input unit 1 is realized in this mode, the mobile object does not need to have equipment necessary for the mobile object to be detected. Alternatively, the position information input unit 1 may detect the position coordinate of the mobile object in a mode in which the mobile object has equipment necessary for coordinate detection. For example, the position information input unit 1 may be realized by a mobile object tracking system using a wireless communication device of a GPS (Global Positioning System) or the like or an ultrasonic transceiver. In the mode in which the mobile object has equipment necessary for coordinate detection, too, the position information input unit 1 does not need to acquire the ID unique to the mobile object from the equipment.

Though it is desirable to install the position information input unit 1 so that the entire tracking area 50 can be detected with no blind spot, a blind spot where detection is partly impossible may be allowed. This is because, even when part of the input position information is missing, the below-mentioned flow line detection unit 3 can identify the position coordinate and the associated ID of the mobile object and create a series of flow line.

The ID information input unit 2 is a device for acquiring the ID of the mobile object in the tracking area 50. However, the ID information input unit 2 cannot always detect the ID when the mobile object exists. Whether or not the ID can be detected depends on the position of the mobile object in the tracking area 50. As an example, an ID of a mobile object existing near the ID information input unit 2 is detected with a high probability, whereas an ID of a mobile object existing away from the ID information input unit 2 is detected with a low probability.

Though FIG. 1 shows one ID information input unit 2, a plurality of ID information input units 2 may be provided in the tracking area 50. Each ID information input unit 2 is assigned an ID information input unit ID (i.e. identification information of the ID information input unit) for uniquely identifying the ID information input unit 2, beforehand. The ID information input unit ID is used to determine which ID information input unit 2 detects the ID of the mobile object. In the following description, the case of expressing the ID information input unit ID by a number is taken as an example, with the ID information input unit ID being referred to as an ID information input unit number. However, the ID information input unit ID may be expressed by other than a number.

The ID information input unit 2 inputs the detected ID of the mobile object, a detection time of the ID, and the ID information input unit number of the ID information input unit 2, to the flow line detection unit 3. A combination of the ID of the mobile object, the detection time, and the ID information input unit number of the ID information input unit 2 detecting the ID is hereafter referred to as ID information. In the case where the ID information input unit 2 tries to detect the ID of the mobile object but cannot detect the ID, the ID information input unit 2 may set the ID of the mobile object to "no ID", and input this information to the flow line detection unit 3 together with the time and the ID information input unit number. As an alternative, the ID information input unit 2 may input no ID information to the flow line detection unit 3 so that the flow line detection unit 3 determines that no mobile object ID is detected at the time.

The ID information input unit 2 may be any device capable of detecting the ID unique to the mobile object and specifying the detection time and the ID information input unit number of the ID information input unit 2. For example, in the case where the mobile object has an active RFID tag and uses a tag ID of the active RFID tag as the ID of the mobile object, an RFID reader may be used as the ID information input unit 2. In the case where the mobile object has an IC card and uses identification information of the IC card as the ID of the mobile object, an IC card reader may be used as the ID information input unit 2. In the case where the mobile object has a wireless LAN terminal and uses a MAC address of the wireless LAN terminal as the ID of the mobile object, an access point may be used as the ID information input unit 2. In the case where a unique bar code is printed on the mobile object, a bar code reader may be used as the ID information input unit 2. In the case where the mobile object is a person, his/her face, fingerprint, vein pattern, or the like may be used as the ID of the person. In this case, a device for reading such an ID may be used as the ID information input unit 2. ID information input units 2 having different detection targets, such as a face authentication device and an RFID reader, may be used in combination.

In the case where a plurality of ID information input units 2 are provided in the tracking area 50, the ID information input units 2 may be located so that the ID information input units 2 have detection areas overlapping with each other, or located so that the ID information input units 2 have detection areas not overlapping with each other.

The detection of the position coordinate of the mobile object by the position information input unit 1 and the detection of the ID of the mobile object by the ID information input unit 2 are performed at the same time. In the case where the position information input unit 1 and the ID information input unit 2 respectively detect the position coordinate and the ID asynchronously, on the other hand, the flow line detection unit 3 may buffer the input position information and ID information for a predetermined period, and use the position information and ID information accumulated in the buffer each time the predetermined period elapses. Alternatively, in the case where the position information input unit 1 and the ID information input unit 2 are not synchronized with each other, when the position information and the ID information are input to the flow line detection unit 3, the flow line detection unit 3 may set the same detection time for the input position information and ID information.

The flow line detection unit 3 calculates, using the position information input from the position information input unit 1 and the ID information input from the ID information input unit 2, a score indicating a level of possibility that the mobile object associated with the ID exists for each position in the tracking area 50, and creates, for each time, information (hereafter referred to as position-score correspondence information) associating each position in the tracking area 50 with the corresponding score. The flow line detection unit 3 determines position-score correspondence information that can be considered to have a definite score at each position in the tracking area 50, based on a predetermined criterion. A time at which this position-score correspondence information is created is referred to as a definite time. The criterion for determining the position-score correspondence information that can be considered to have the definite score at each position will be described later. The flow line detection unit 3 modifies a score at a time nearest the definite time, based on the score at the definite time. The flow line detection unit 3 then sets the time of the modified score as a definite time, and equally modifies a score at a time nearest the definite time. The flow line detection unit 3 repeats this process. A time which is not the definite time is hereafter also referred to as an indefinite time. As described above, the flow line detection unit 3 determines the definite time and, while tracing its nearest indefinite time, modifies the score at the indefinite time. The flow line detection unit 3 detects the flow line of the mobile object, using the modified score at each time.

The flow line output unit 4 is an output device for outputting the flow line detected by the flow line detection unit 3. The output mode of the flow line is not particularly limited. For example, in the case of displaying the flow line, a display device may be used as the flow line output unit 4. In the following description, the case where the flow line output unit 4 displays the flow line is taken as an example.

Figure 2:
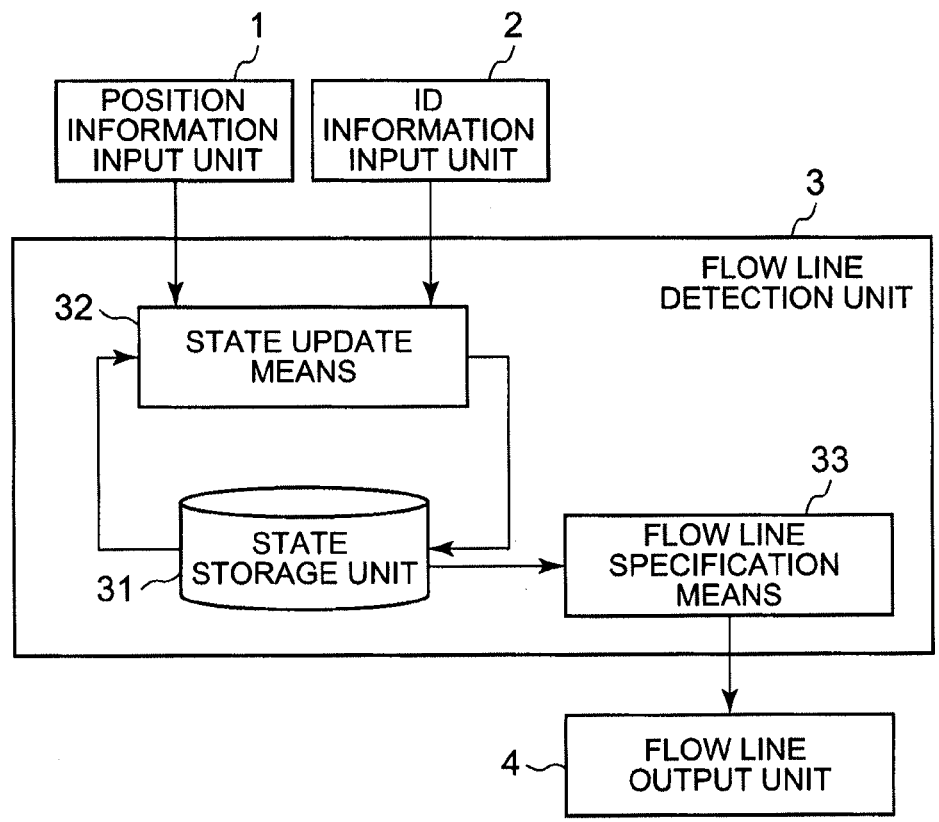
FIG. 2 is a block diagram showing an example of a structure of a flow line detection unit.

FIG. 2 is a block diagram showing an example of a structure of the flow line detection unit 3. The position information input unit 1, the ID information input unit 2, and the flow line output unit 4 are also shown in FIG. 2. The flow line detection unit 3 includes a state storage unit 31, state update means 32, and flow line specification means 33.

The state storage unit 31 is a storage device for storing, for each mobile object ID, a score state of each position in the tracking area 50 at each time. In detail, the state storage unit 31 stores a combination of a time, a mobile object ID, and position-score correspondence information relating to the mobile object at the time. The combination of the time, the ID, and the position-score correspondence information is hereafter referred to as state information.

The state update means 32 reads, for each mobile object ID, state information created at a previous time from the state storage unit 31, and updates position-score correspondence information of the previous time based on the state information, a mobility model, and detection results of a position coordinate and an ID of the mobile object at a current time. Though the term "update" is used here for convenience's sake, the state update means 32 actually keeps the state information of the previous time without change, and newly creates position-score correspondence information of the current time from the position-score correspondence information included in the state information and stores, in the state storage unit 31, new state information (state information of the current time) including the current time, the ID of interest, and the position-score correspondence information. Hence, the state update means 32 may be also referred to as state information creation means.

Note that the previous time is a time in the past at which state information is created and which is nearest the current time.

The state update means 32 propagates the score of each position shown in the position-score correspondence information of the previous time, to its neighboring position(s).

The state update means 32 then reflects the position information and the ID information of the current time in the propagation result, thereby creating the position-score correspondence information of the current time. The mobility model is a rule defining the mode of score propagation. A specific example of the mobility model and a detailed process of propagating the score of the previous time to create the position-score correspondence information of the current time will be described later.

For each ID, the state update means 32 creates one piece of position-score correspondence information at each time, and accumulates the created position-score correspondence information in the state storage unit 31.

The state update means 32 may store all state information created at all times for each ID, in the state storage unit 31. Alternatively, the state update means 32 may sequentially delete state information created a predetermined period or more ago with respect to the current time, from the state storage unit 31.

The flow line specification means 33 selects an ID, and determines state information that can be considered to have a definite score at each position for the selected ID. A time indicated by this state information is a definite time. While tracing an indefinite time nearest the definite time, the flow line specification means 33 modifies a score shown in position-score correspondence information of the indefinite time. Regarding the ID of interest (selected ID), the flow line specification means 33 references to the position-score correspondence information of each time after modification, and traces a peak score position at each time, thereby specifying the flow line of the mobile object identified by the ID of interest. The flow line specification means 33 selects each mobile object ID one by one, and repeats the same process. By specifying the flow line for every ID, the flow line specification means 33 can specify the flow line for each mobile object that exists in the tracking area 50 (see FIG. 1) and is identified by the corresponding ID.

The position-score correspondence information mentioned above may be any information that associates each position in the tracking area 50 with the score numerically indicating the level of possibility that the mobile object identified by the ID exists at the position. Suppose the tracking area 50 is divided in a grid, with each division area being referred to as a cell. The position-score correspondence information is, for example, expressed as a set of information associating the coordinate of each individual cell with the corresponding score. Alternatively, the tracking area 50 may be divided into predetermined areas for each of which a score is determined, where each area is referred to as a node and adjacency between areas is referred to as a link. The position-score correspondence information may then be expressed by a network composed of nodes and links.

Though the case where the detected position coordinate of the mobile object and the coordinate of each individual division area of the tracking area 50 are each expressed by a two-dimensional coordinate value is taken as an example here, the coordinate may instead be a one-dimensional coordinate value or a three-dimensional coordinate value.

Figure 3:
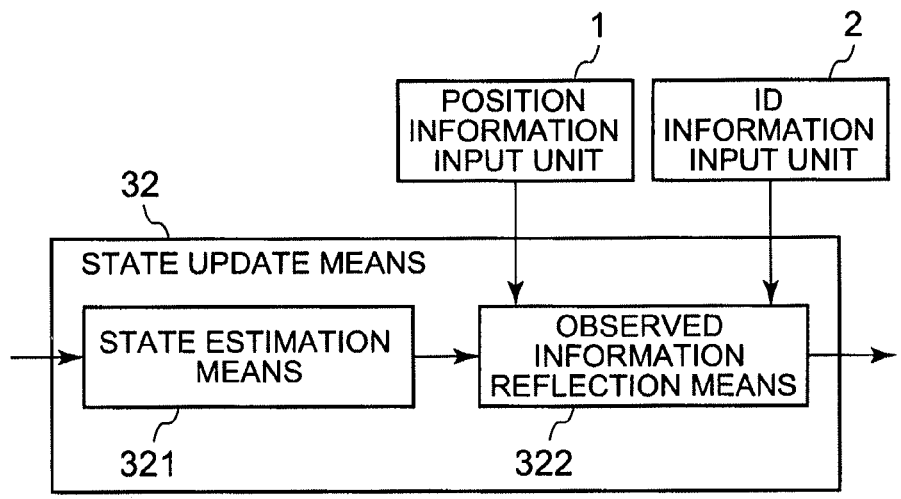
FIG. 3 is a block diagram showing an example of a structure of state update means.

FIG. 3 is a block diagram showing an example of a structure of the state update means 32. The state update means 32 includes state estimation means 321 and observed information reflection means 322. The state estimation means 321 propagates, according to a predetermined mobility model, the score of each position shown in the position-score correspondence information of the previous time, as the score of its neighboring position(s), thereby creating new position-score correspondence information. This position-score correspondence information can be regarded as an estimate of the position-score correspondence information of the current time. The observed information reflection means 322 reflects the position information of the current time input from the position information input unit 1 and the ID information of the current time input from the ID information input unit 2, in the new position-score correspondence information (the estimated position-score correspondence information of the current time) created by the state estimation means 321. The observed information reflection means 322 thus determines the position-score correspondence information of the current time. The input position information and ID information may be referred to as observed information.

The state estimation means 321 and the observed information reflection means 322 are described in more detail below.

The state estimation means 321 reads, from the state storage unit 31, the position-score correspondence information included in the state information of each ID created at the previous time, and newly creates a copy of the position-score correspondence information of each ID. The state estimation means 321 performs the process of propagating the score to its neighboring position(s) in the copied position-score correspondence information, according to the predetermined mobility model. The newly created position-score correspondence information is updated by this score propagation process. The state estimation means 321 inputs the processed position-score correspondence information to the observed information reflection means 322.

Figure 4:
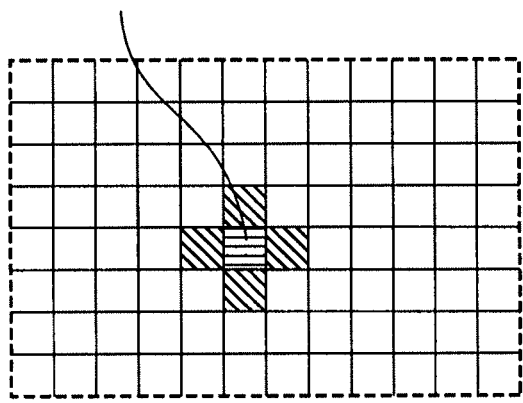
FIG. 4 is an explanatory diagram showing a specific example of a mobility model.
Figure 4:
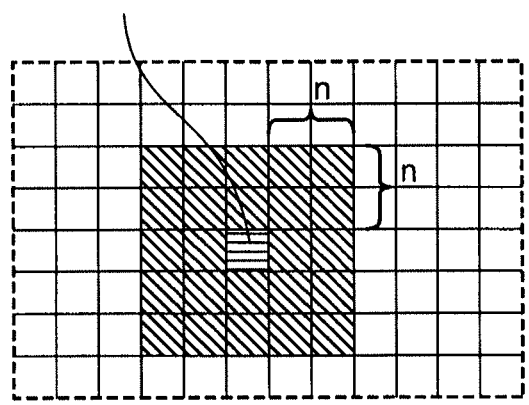
Figure 5:
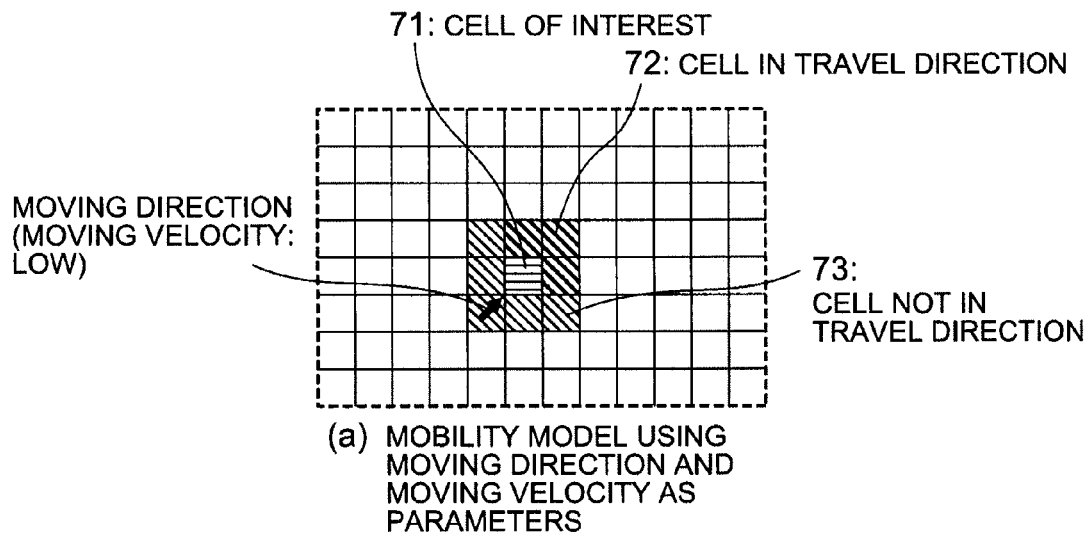
FIG. 5 is an explanatory diagram showing a specific example of a mobility model.
Figure 5:
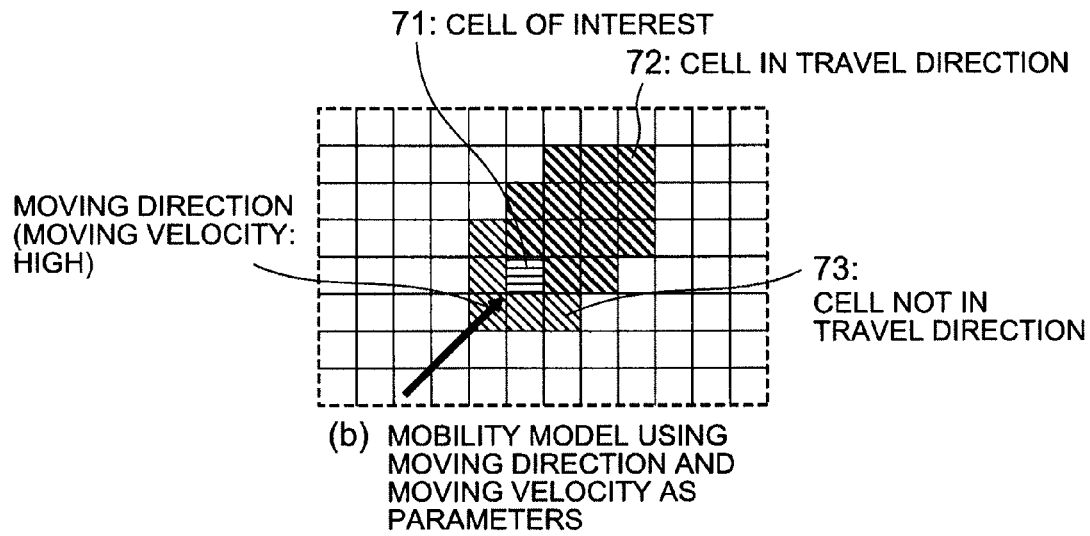

The following describes a specific example of the mobility model. The mobility model is a rule defining the mode of propagating the score in the position-score correspondence information to its neighboring position(s). FIGS. 4 and 5 are explanatory diagrams showing specific examples of the mobility model. It is assumed here that the position-score correspondence information is a set of information associating the coordinate of each individual cell with the score. In each of FIGS. 4 and 5, the position-score correspondence information is shown as a map.

FIG. 4(*a*) schematically shows a mobility model of propagating a score of a cell 71 of interest in the position-score correspondence information to its upper, lower, left, and right cells per time step. In FIG. 4, the cell which is the score propagation source is shown by a scattered pattern, whereas the cell which is the score propagation destination is shown by thin oblique lines. The mobility model shown in FIG. 4(*a*) is a mobility model defined from a perspective that the mobile object existing in the cell at the previous time can move to the adjacent cell in the up, down, left, or right direction on the map. In the case where the mobility model shown in FIG. 4(*a*) as an example is applied, the state estimation means 321 performs the process of propagating the score of the cell to its upper, lower, left, and right cells in the position-score correspondence information copied from the position-score correspondence information of the previous time, to update the position-score correspondence information.

In the position-score correspondence information, the score indicating the level of possibility that the mobile object exists is set for each cell. The state estimation means 321 focuses on each cell as the cell of interest, and propagates the score of the cell. That is, the state estimation means 321 propagates the score for every individual cell. Here, scores from a plurality of cells are propagated to one cell. Regarding such a cell which is the score propagation destination from the plurality of cells, the state estimation means 321 sets a maximum score of the propagation source cells, as a new score. The same applies to the case where a mobility model other than that shown in FIG. 4(*a*) is used.

FIG. 4(b) schematically shows a mobility model of propagating the score of the cell 71 of interest up to n-th cells in the vertical, horizontal, and diagonal directions per time step. Such a mobility model is also applicable.

Alternatively, a mobility model of propagating the score in the moving direction of the mobile object using the moving direction and moving velocity of the mobile object at the previous time as parameters may be applied. FIGS. 5(a) and 5(b) schematically show a mobility model of propagating the score of the cell 71 of interest to a cell 72 in the travel direction while decreasing the score of a cell which is not in the travel direction among the cells surrounding the cell 71 of interest. FIG. 5(a) shows an example in the case where the moving velocity of the mobile object is low, and FIG. 5(b) shows an example in the case where the moving velocity of the mobile object is high. The range of cells 72 in the travel direction may be set beforehand, according to the moving direction and moving velocity of the mobile object. The range of cells 72 in the travel direction may be widened in the case where the velocity is high, as shown in FIG. 5(b).

In the case where an obstacle exists in the tracking area 50, the state estimation means 321 may store the coordinate of the obstacle beforehand, so as not to propagate the score to the position of the obstacle as the movement to the position is impossible. As an alternative, the state estimation means 321 may set, as a cost, an extra time required when the mobile object moves over the obstacle, for the area where the obstacle exists. The state estimation means 321 may then propagate the score while incorporating the cost into the mobility model.

The observed information reflection means 322 receives the input of the combination of the position coordinate of the mobile object and the detection time of the position coordinate from the position information input unit 1, as the position information. The observed information reflection means 322 also receives the input of the combination of the ID of the mobile object, the ID information input unit number of the ID information input unit 2, and the detection time of the ID from the ID information input unit 2, as the ID information. The observed information reflection means 322 further receives the input of the position-score correspondence information after the score propagation process from the state estimation means 321. The position-score correspondence information is input to the observed information reflection means 322 for each mobile object ID.

The observed information reflection means 322 reflects the position information and the ID information of the current time, in the input position-score correspondence information. This process is described below.

The process of reflecting the ID information in the position-score correspondence information is described first.

The observed information reflection means 322 stores the ID detection area corresponding to the ID information input unit number beforehand. The ID detection area is a predetermined area that can be considered as an area in which the ID information input unit 2 detects the ID of the mobile object with a detection probability equal to or more than a predetermined probability. The ID detection area is, for example, set by a manager of the flow line detection system beforehand. Since it is difficult to precisely define the ID detection area as an area in which the ID is detected with the detection probability equal to or more than the predetermined probability, the ID detection area may be an area determined by the manager or the like that can be considered as an area in which the ID is detected with the detection probability equal to or more than the predetermined probability. The ID detection area is set for each ID information input unit 2 (i.e. for each ID information input unit number).

The observed information reflection means 322 focuses on each individual mobile object ID as the ID of interest and, in the position-score correspondence information (position-score correspondence information input from the state estimation means 321) of the ID of interest, updates the score so that the amount of score increase in the ID detection area corresponding to the ID information input unit number of the ID information input unit 2 detecting the ID of interest is larger than the amount of score increase in the other area. Here, the ID information input unit number of the ID information input unit 2 detecting the ID may be determined based on the ID information input from the ID information input unit 2. That is, when the ID information input unit number combined with the ID of interest is input from the ID information input unit 2, the score is updated so that the amount of score increase in the ID detection area corresponding to the ID information input unit number is larger than the amount of score increase in the other area. Note that the amount of score increase may be negative, as long as the score is updated so that the amount of score increase in the ID detection area corresponding to the ID information input unit number of the ID information input unit 2 detecting the ID of interest is larger than the amount of score increase in the other area.

A specific example of this score update is described below. For example, suppose two ID detection areas, i.e. an ID detection area a and an ID detection area b, are defined in the tracking area 50, and two mobile objects whose IDs are respectively ID1 and ID2 exist. In the case where the ID information input from the ID information input unit 2 indicates that only ID1 is detected in the ID detection area a at a given time, for example, the score update is performed so that only the score included in the ID detection area a is increased while the score in the other area is unchanged, in the position-score correspondence information of ID1. Meanwhile, since ID2 is not detected, the score is unchanged in the position-score correspondence information of ID2.

The observed information reflection means 322 may add a predetermined value to the score in the ID detection area where the ID is detected, and add a value smaller than the predetermined value to the score in the area where the ID is not detected. Here, the score in the area where the ID is not detected may be maintained (i.e. unchanged) as in the above-mentioned example, or a value may be subtracted from the score in the area where the ID is not detected.

Alternatively, the observed information reflection means 322 may maintain the score in the ID detection area where the ID is detected without change, and subtract a value from the score in the area where the ID is not detected or divide the score in the area where the ID is not detected by a value equal to or more than 1.

Alternatively, the observed information reflection means 322 may multiply the score in the ID detection area where the ID is detected by a value, and multiply the score in the area where the ID is not detected by a value smaller than the former value. Here, the score in the area where the ID is not detected may be maintained, or the score in the area where the ID is not detected may be divided by a value equal to or more than 1.

In the above-mentioned various operations for changing, for example, the score of the ID detection area where the ID is detected based on the ID information, a predefined coefficient or a coefficient dynamically determined depending on the ID detection status may be used in order to calculate the score while taking an ID detection error into account. For instance, ID overdetection or underdetection tends to occur near a boundary of the ID detection area, as compared with a center part of the ID detection area. Accordingly, the amount of score increase may be varied by using different coefficients for the center part of the ID detection area and the vicinity of the boundary of the ID detection area, within the ID detection area. Moreover, in the case where a plurality of ID information input units 2 exist in the tracking area 50 and a plurality of ID detection areas are defined, the amount of score increase may be varied so that the amount of score increase in an ID detection area where false detection tends to occur is small and the amount of score increase in an ID detection area where false detection tends not to occur is large.

The process of reflecting the position information on the position-score correspondence information is described next.

For the position-score correspondence information (position-score correspondence information input from the state estimation means 321) of each ID, the observed information reflection means 322 updates the score so that the amount of score increase corresponding to the position coordinate input from the position information input unit 1 is larger than the amount of score increase in the other area. The amount of score increase may be negative, as long as the score is updated so that the amount of score increase corresponding to the input position coordinate is larger than the amount of score increase in the other area.

A specific example of this score update is described below. Suppose two mobile objects whose IDs are respectively ID1 and ID2 exist. In the case where the position information input from the position information input unit 1 indicates that two position coordinates (x1, y1) and (x2, y2) are detected at a given time, the observed information reflection means 322 updates the score so that the amount of score increase in (x1, y1) and (x2, y2) is larger than the amount of score increase in the other area, in the position-score correspondence information of ID1. The observed information reflection means 322 equally updates the score so that the amount of score increase in (x1, y1) and (x2, y2) is larger than the amount of score increase in the other area, in the position-score correspondence information of ID2.

The observed information reflection means 322 may add a predetermined value to the score in the area of the detected position coordinate, and add a value smaller than the predetermined value to the score in the other area. Here, the score in the area other than the area of the detected position coordinate may be maintained without change, or a value may be subtracted from the score in the area other than the area of the detected position coordinate.

Alternatively, the observed information reflection means 322 may maintain the score in the area of the detected position coordinate without change, and subtract a value from the score in the other area or divide the score in the other area by a value equal to or more than 1.

Alternatively, the observed information reflection means 322 may multiply the score in the area of the detected position coordinate by a value more than 1, and multiply the score in the other area by a value smaller than the former value. Here, the score in the area other than the area of the detected position coordinate may be maintained, or the score in the other area may be divided by a value equal to or more than 1.

In the above-mentioned various operations for changing the score based on the detected position coordinate, a predefined coefficient or a coefficient dynamically determined depending on the detected position coordinate may be used in order to calculate the score while taking a position coordinate detection error into account. For example, in the case where the position coordinate detection error is predetermined, the score may be changed so that the amount of score increase in an area which has the detected position coordinate at its center and also takes the detection error into account is larger than the amount of score increase in the other area. In the case where false detection tends to occur at a specific position in the tracking area 50, for the position coordinate of the mobile object detected at the position, the score may be changed in a wide area including its surrounding, with a smaller amount of score increase than the amount of score increase in the position coordinate detected at the other position.

After performing the process of changing the score for the position-score correspondence information of each mobile object ID input from the state estimation means 321, the observed information reflection means 322 stores state information associating the ID, the position-score correspondence information, and the detection time (current time) obtained from the position information or the ID information with each other, in the state storage unit 31. The observed information reflection means 322 stores the state information in the state storage unit 31 for each ID.

Figure 6:
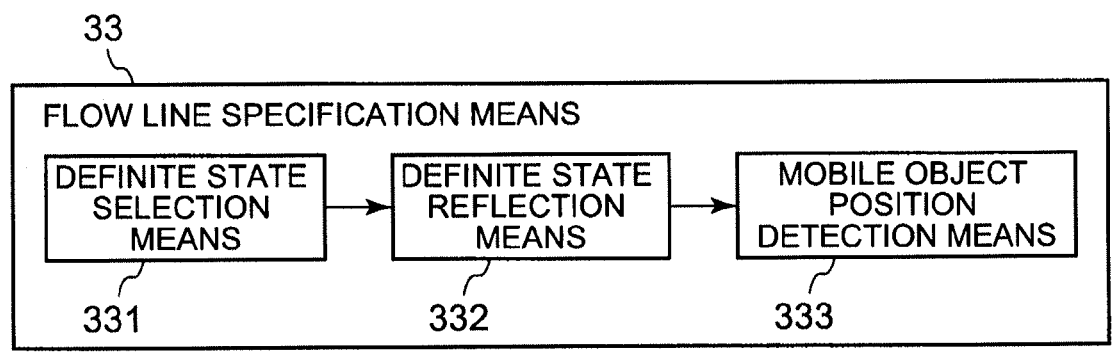
FIG. 6 is a block diagram showing an example of a structure of flow line specification means.

FIG. 6 is a block diagram showing an example of a structure of the flow line specification means 33. The flow line specification means 33 includes definite state selection means 331, definite state reflection means 332, and mobile object position detection means 333.

The definite state selection means 331 acquires state information of each ID created during a past predetermined period from the current time, from the state storage unit 31. The definite state selection means 331 extracts state information including an ID of a mobile object which is subjected to flow line derivation, from the acquired state information. As a result, state information at each time is extracted as the state information of the ID. The definite state selection means 331 selects state information of a definite time, from the state information of the ID at each time.

Here, the definite state selection means 331 determines state information that can be considered to have a definite score at each position in the tracking area 50, based on a predetermined criterion. A time indicated by the state information is a definite time. The state information that can be considered to have the definite score at each position in the tracking area 50 is hereafter referred to as definite state information. An example of the above-mentioned criterion for determining the definite state information is a criterion that "state information created at a most recent time is set as definite state information". In the position-score correspondence information included in the state information created at the most recent time, the score of each position in the tracking area is updated based on a larger number of effective position coordinate and ID observation results. That is, in the position-score correspondence information of the most recent time, more pieces of observed information effective for flow line derivation are reflected in the score of each position. Accordingly, the position-score correspondence information included in the state information can be considered to have the definite score at the flow line derivation time. Hence, the definite state selection means 331 may determine the state information created at the most recent time as the definite state information, based on the above-mentioned criterion.

Another example of the criterion for determining the definite state information is a criterion that "state information of a time at which the position coordinate and the ID of the mobile object are both detected is set as definite state information". At the time when the position coordinate and the ID of the mobile object are detected, a more prominent peak appears in each score in the tracking area, than at a time when the position coordinate and the ID are not detected. Hence, the definite state selection means 331 may set the time when the position coordinate and the ID of the mobile object are both detected as the definite time, and determine the estate information of the definite time as the definite state information.

The definite state reflection means 332, while tracing an indefinite time nearest the definite time, modifies the score shown in the position-score correspondence information of the indefinite time. In the case where the most recent time is set as the definite time, the definite state reflection means 332 sequentially traces each indefinite time from the definite time to the past. In the case where the time when the position coordinate and the ID of the mobile object are both detected is set as the definite time, the definite state reflection means 332 sequentially traces each indefinite time from the definite time to the past and to the future.

In the case of modifying the position-score correspondence information of the indefinite time nearest the definite time, the definite state reflection means 332 first propagates the score of each position according to the mobility model, for the position-score correspondence information of the definite time. This process is the same as the score propagation process by the state estimation means 321. In detail, the definite state reflection means 332 creates a copy of the position-score correspondence information of the definite time, and executes the process of propagating the score of each position to its neighborhood in the copy.

The definite state reflection means 332 reflects the position-score correspondence information on which the process of propagating the score to the neighborhood is performed, in the position-score correspondence information of the nearest indefinite time. To reflect the position-score correspondence information (position-score correspondence information of the definite time) after the score propagation process in the position-score correspondence information of the nearest indefinite time, the definite state reflection means 332 may, for example, add the score of each cell in the position-score correspondence information of the definite time to the score of the corresponding cell in the position-score correspondence information of the nearest indefinite time, or multiply, by the score of each cell in the position-score correspondence information of the definite time, the score of the corresponding cell in the position-score correspondence information of the nearest indefinite time. The definite state reflection means 332 may also multiply the score of each cell in the position-score correspondence information of the definite time by a coefficient, and add the multiplication result to the score of the corresponding cell in the position-score correspondence information of the nearest indefinite time or multiply the score of the corresponding cell in the position-score correspondence information of the nearest indefinite time by the multiplication result.

The definite state reflection means 332 sets the position-score correspondence information of the indefinite time on which the above-mentioned operation is performed as position-score correspondence information of a definite time, and repeats the same process.

There is an instance where at which position a mobile object corresponding to which ID exists cannot be uniquely determined from only position-score correspondence information of an indefinite time. Even in such an instance, by reflecting the position-score correspondence information of the definite time in the position-score correspondence information of the indefinite time as described above, the score at the indefinite time can be provided with a more prominent peak. As a result, at which position a mobile object corresponding to which ID exists can be uniquely determined with more accuracy.

The mobile object position detection means 333 detects the position of the mobile object at each time, from the position-score correspondence information of each time processed by the definite state reflection means 332. In this exemplary embodiment, the mobile object position detection means 333 detects, as the position of the mobile object, a position having a peak score, from the position-score correspondence information of each time. An example of the mode of detecting the position having the peak score is a mode of detecting a position having a maximum score. Another example of the mode of detecting the position having the peak score is a mode of detecting a center of gravity of each position where the score is equal to or more than a predetermined value. The mobile object position detection means 333 determines the position detected from the position-score correspondence information of a given time, as the position where the mobile object of the ID of interest exists at the time. The mobile object position detection means 333 detects the position having the peak score from the position-score correspondence information for each time, and sets time-series information of the detected positions as the flow line. Thus, the flow line of the mobile object corresponding to the ID selected by the definite state selection means 331 is obtained.

Regarding the operation timings of the state update means 32 and the flow line specification means 33, the state update means 32 and the flow line specification means 33 may operate synchronously so that the flow line specification means 33 specifies the flow line whenever the state update means 32 creates the state information of each ID. Alternatively, the state update means 32 and the flow line specification means 33 may operate asynchronously so that the state update means 32 performs the process whenever the position information and the ID information are input, and the flow line specification means 33 performs the flow line detection process in a different cycle irrespective of the input cycle of the position information and the ID information. Alternatively, the flow line specification means 33 may perform the flow line detection process non-cyclically according to need. For example, the flow line specification means 33 may perform the flow line detection process when instructed to detect the flow line by the manager of the flow line detection system.

In Exemplary Embodiment 1, the state update means 32 (the state estimation means 321 and the observed information reflection means 322) and the flow line specification means 33 (the definite state selection means 331, the definite state reflection means 332, and the mobile object position detection means 333) are realized, for example, by a CPU of a computer operating according to a flow line detection program. In this case, the flow line detection program may be stored in a program storage device (not shown) of the computer, with the CPU reading the program and, according to the program, operating as the state update means 32 (the state estimation means 321 and the observed information reflection means 322) and the flow line specification means 33 (the definite state selection means 331, the definite state reflection means 332, and the mobile object position detection means 333). The state update means 32 and the flow line specification means 33 may be each realized by separate hardware. The state estimation means 321 and the observed information reflection means 322 may be each realized by separate hardware. The definite state selection means 331, the definite state reflection means 332, and the mobile object position detection means 333 may be each realized by separate hardware.

The following describes operations.

Figure 7:
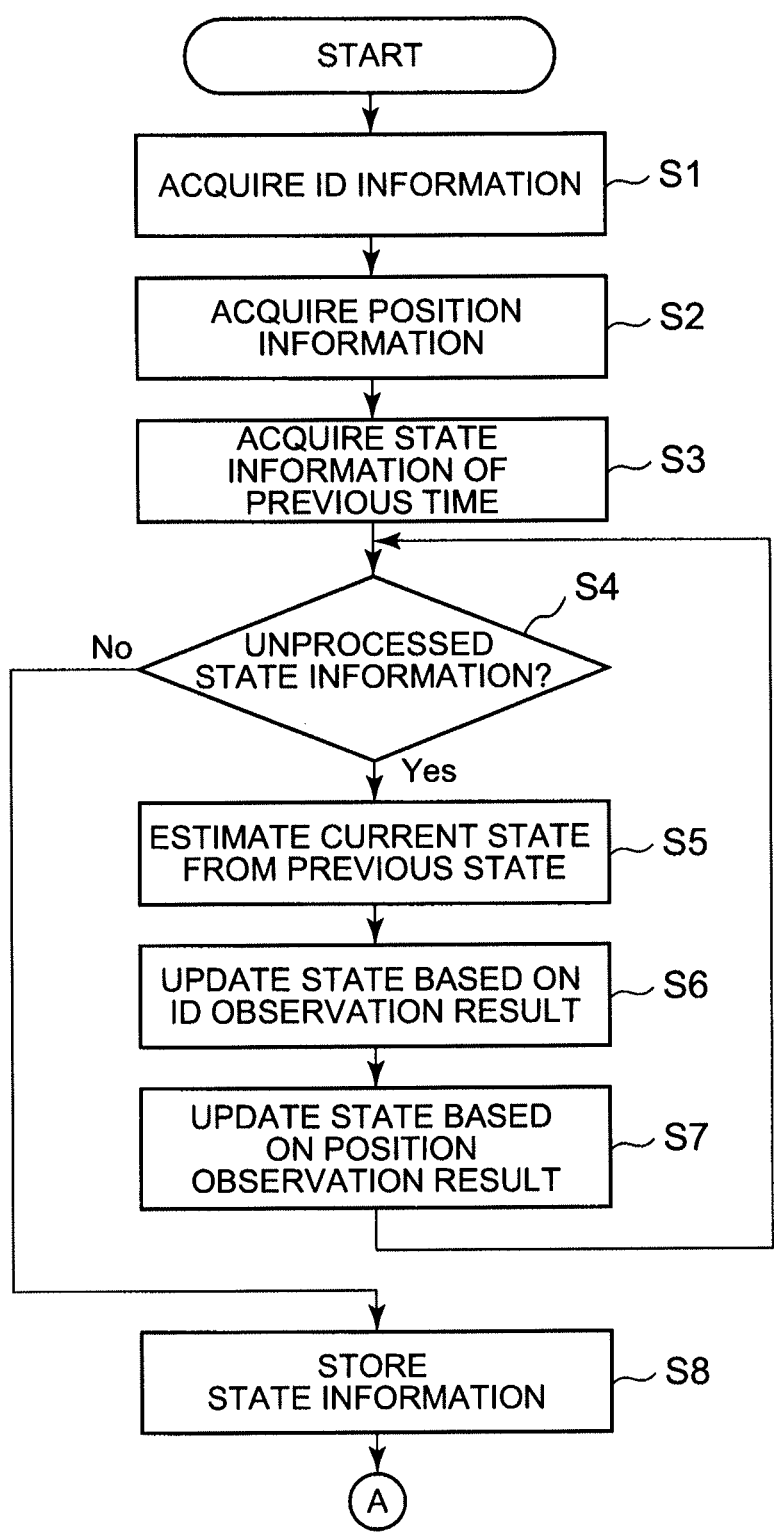
FIG. 7 is a flowchart showing an example of a process of the flow line detection unit in Exemplary Embodiment 1.
Figure 8:
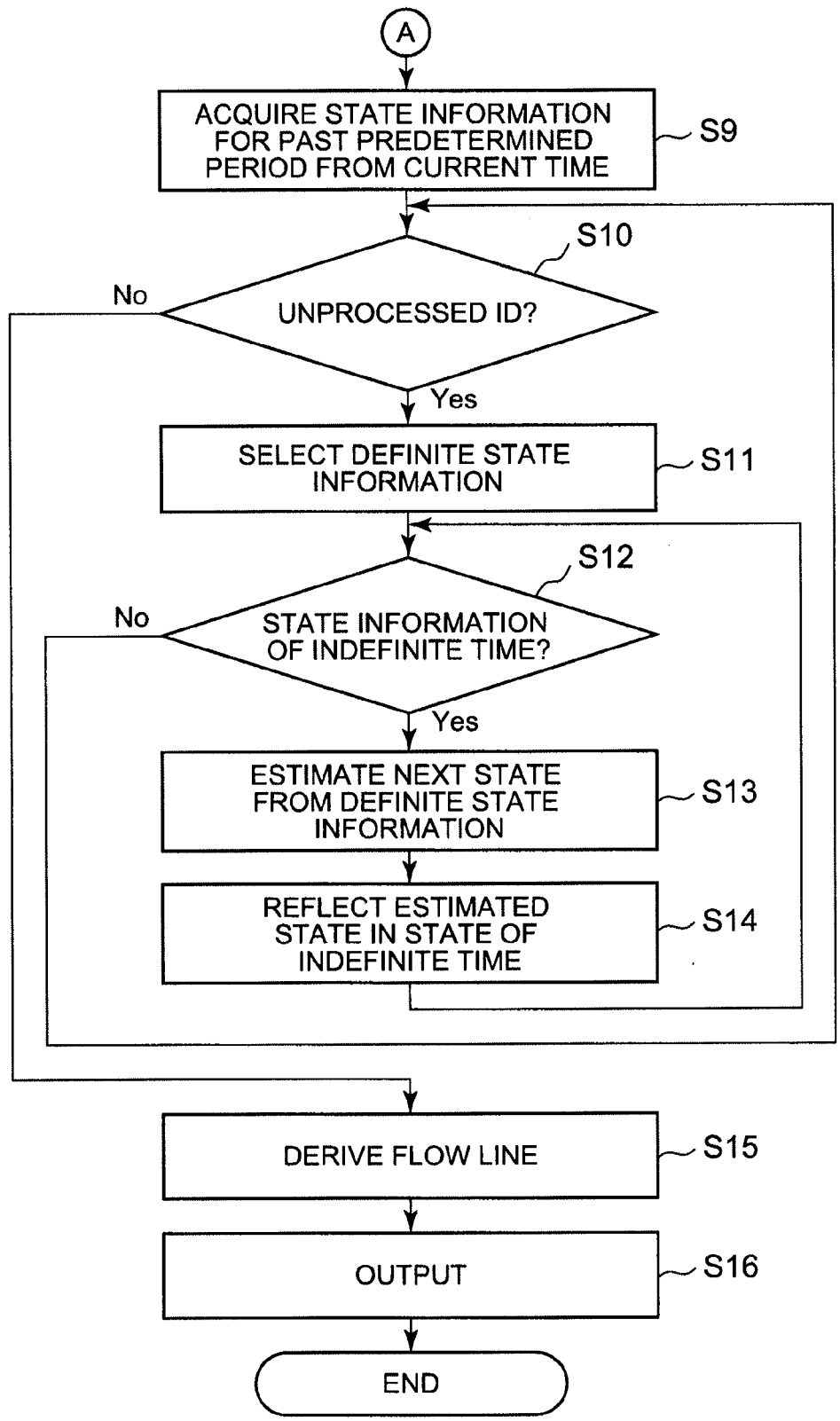
FIG. 8 is a flowchart showing an example of a process of the flow line detection unit in Exemplary Embodiment 1.

FIGS. 7 and 8 are flowcharts showing an example of the process of the flow line detection unit 3 in Exemplary Embodiment 1. The example of the process in Exemplary Embodiment 1 is described below, while showing a specific example in FIGS. 9 to 16.

Figure 9:
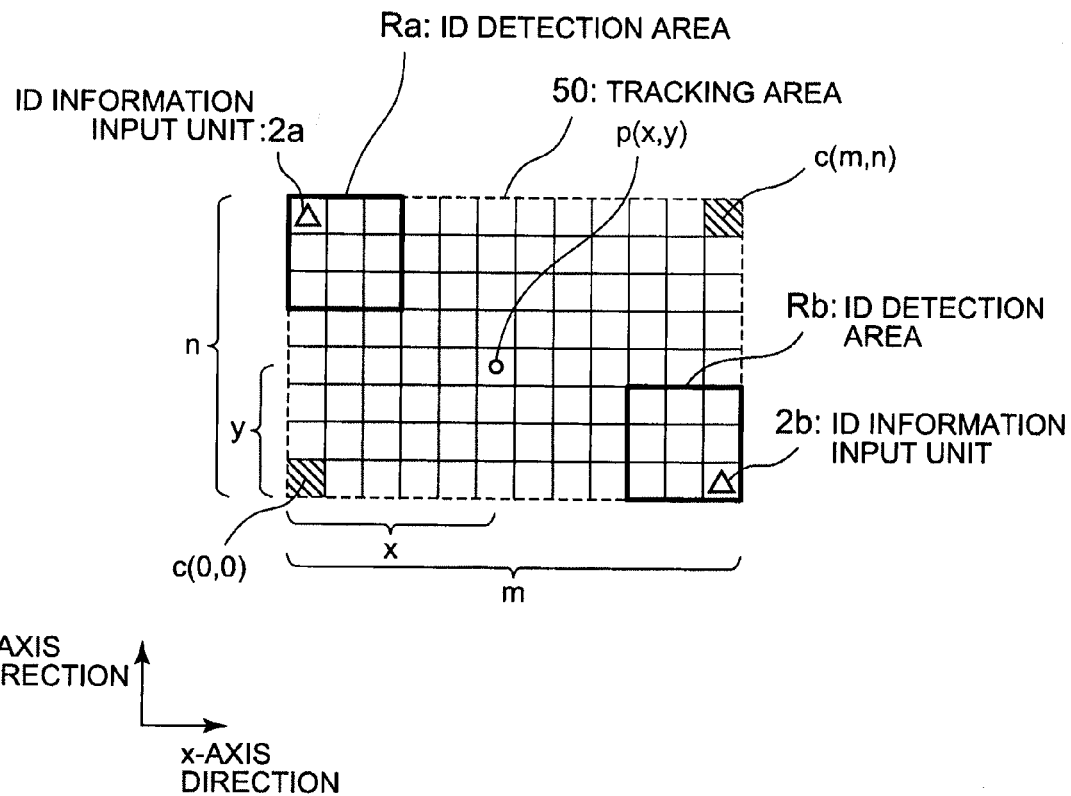
FIG. 9 is an explanatory diagram showing an example of cells set by dividing a tracking area in a grid.

FIG. 9 is an explanatory diagram showing an example of cells set by dividing the tracking area 50 in a grid, as cells for defining scores. Positions of two ID information input units 2a and 2b provided in the tracking area 50 are also shown in FIG. 9. The bottom left of the map of the tracking area 50 is set as an origin point (0, 0), and an arbitrary position coordinate on the map is expressed as p(x, y), for convenience's sake. Meanwhile, a coordinate of an arbitrary cell on the map is expressed as c(m, n). Though the number of cells obtained by division may be arbitrarily set, a range of 0 to 11 in the x-axis direction and a range of 0 to 7 in the y-axis direction are used in this example. In this example, the ID information input units 2a and 2b are respectively located at c(0, 7) and c(11, 0). An ID detection area is defined for each of the ID information input units 2a and 2b beforehand. In this example, a rectangle whose bottom left is c(0, 5) and whose top right is c(2, 7) is an ID detection area Ra of the ID information input unit 2a, and a rectangle whose bottom left is c(9, 0) and whose top right is c(11, 2) is an ID detection area Rb of the ID information input unit 2b.

Figure 10:
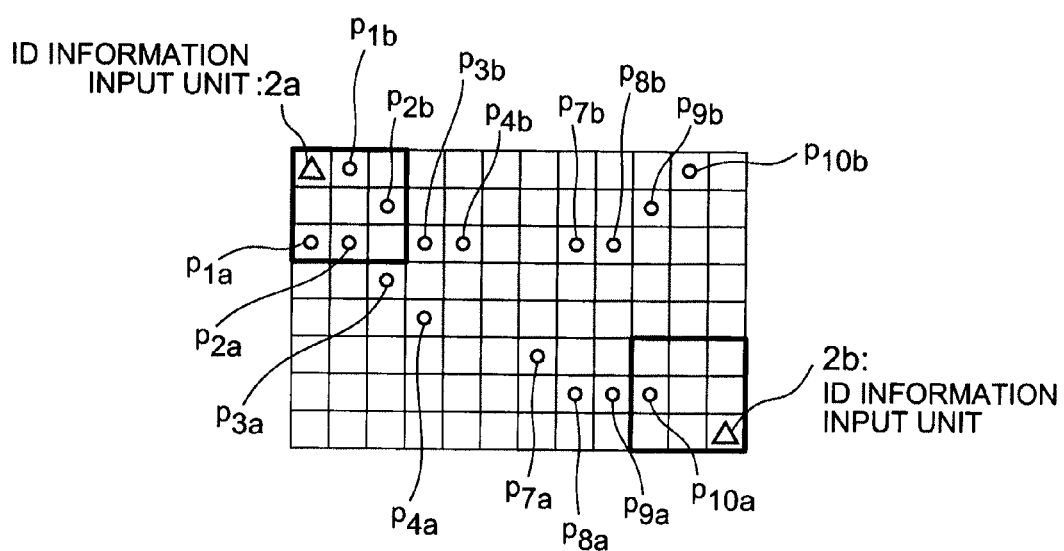
FIG. 10 is an explanatory diagram showing an example of detected positions of mobile objects.
Figure 12:
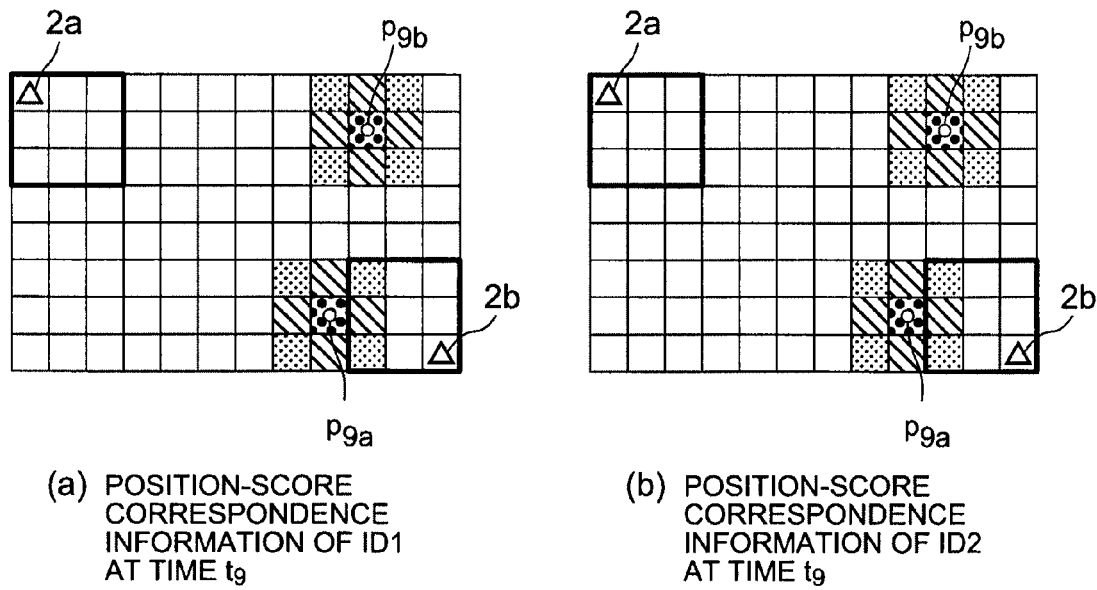
FIG. 12 is an explanatory diagram showing a specific example of a situation of score update in position-score correspondence information.
Figure 13:
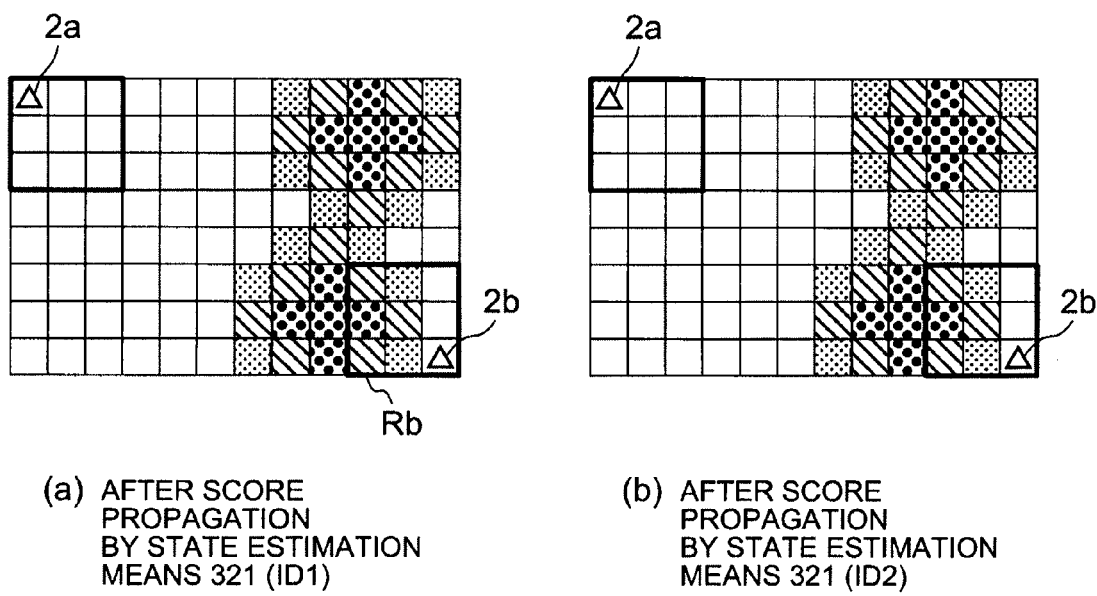
FIG. 13 is an explanatory diagram showing a specific example of a situation of score update in position-score correspondence information.
Figure 14:
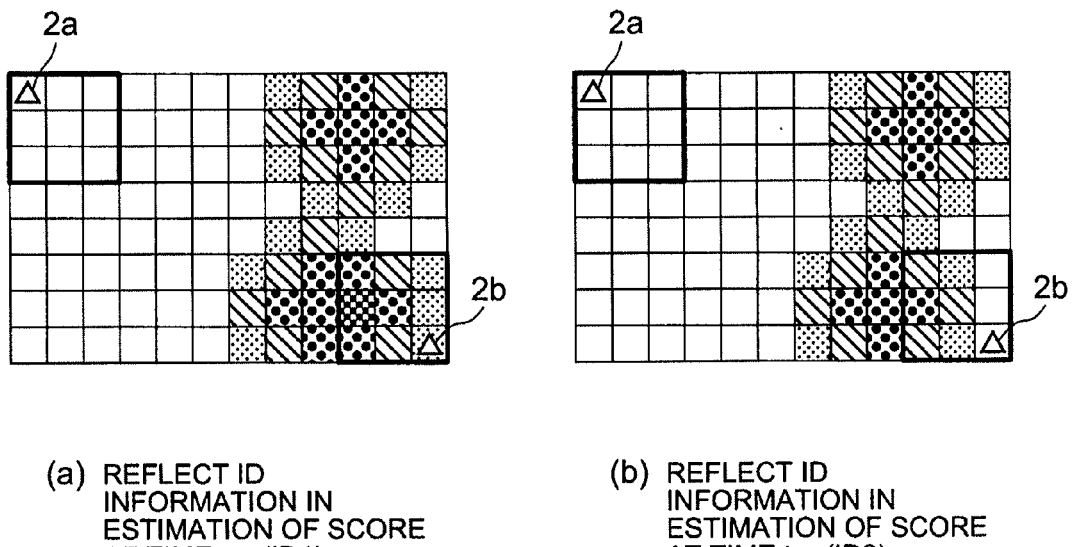
FIG. 14 is an explanatory diagram showing a specific example of a situation of score update in position-score correspondence information.
Figure 15:
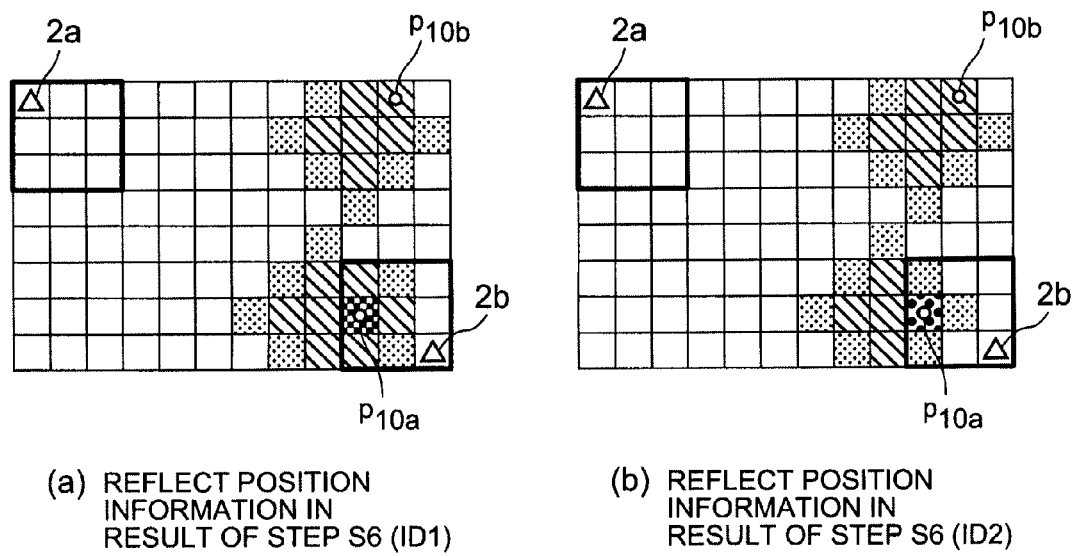
FIG. 15 is an explanatory diagram showing a specific example of a situation of score update in position-score correspondence information.

FIG. 10 is a diagram showing an example of detected positions at times $t_1$ to $t_{10}$, for two mobile objects a and b moving in the tracking area 50. In the example shown in FIG. 10, a state in which the positions detected from the mobile object a are $p_{1a}$ to $p_{10a}$ and the positions detected from the mobile object b are $p_{1b}$ to $p_{10b}$ is a true state. Moreover, a state in which the mobile object a is associated with ID1 and the mobile object b is associated with ID2 is a true state. The absence of $p_{5a}$, $p_{6a}$, $p_{5b}$, and $p_{6b}$ in FIG. 10 means no position coordinate is detected at the times $t_5$ and $t_6$. Note that, in $p_{1a}$ to $p_{10a}$ and $p_{1b}$ to $p_{10b}$, the numerical subscript indicates at which of the times $t_1$ to $t_{10}$ the position is detected, and the subscript a or b indicates from which of the mobile objects a and b the position is detected.

FIG. 11 shows an ID detection status of each ID information input unit at the times $t_1$ to $t_{10}$. In this example, the ID information input unit 2a detects "ID1" and "ID2" at the times $t_1$ and $t_2$, and the ID information input unit 2b detects "ID1" at the time $t_{10}$. Each blank field in FIG. 11 indicates that no mobile object ID is detected. This example concerns the case where the ID is reliably detected when the mobile object exists in the ID detection area Ra or Rb and the ID is not detected at all when the mobile object exists outside the ID detection area (see FIGS. 10 and 11). However, since it is difficult to precisely define a boundary between an area where the mobile object ID can be reliably detected and an area where the mobile object ID cannot be detected at all and determine an ID detection area, mobile object ID underdetection or overdetection may be allowed.

As mentioned above, the numerical subscript of the sign of the detected position of the mobile object shown in FIG. 10 indicates the detection time of the position. In the example shown in FIGS. 10 and 11, at the time $t_1$, the position information input unit 1 (not shown in FIG. 10) detects the position coordinates $p_{1a}$ and $p_{1b}$ and the ID information input unit 2a detects ID1 and ID2. Moreover, at the time $t_{10}$, the position information input unit 1 detects the position coordinates $p_{10a}$ and $p_{10b}$ and the ID information input unit 2b detects ID1.

Figure 16:
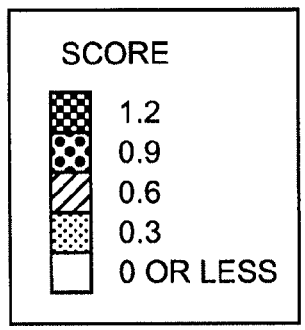
FIG. 16 is an explanatory diagram showing score values of cells shown in FIGS. 12 to 15.

FIGS. 12 to 15 are each an explanatory diagram showing a specific example of a situation of score update in position-score correspondence information. In FIGS. 12 to 15, the position-score correspondence information is schematically shown as a map of cells, and the score of each cell is distinguished by a different pattern. FIG. 16 is an explanatory diagram showing score values of the cells shown in FIGS. 12 to 15. As shown in FIG. 16, a white cell has a score of 0 or less.

In the position-score correspondence information shown in FIGS. 12 to 15, however, the score of each white cell is negative.

The following describes a specific process flow.

First, the state update means 32 acquires the ID information (i.e. combination of the mobile object ID, the ID information input unit number, and the detection time of the ID) from the ID information input unit 2 (step S1). In this example, the current time is the time $t_{10}$ shown in FIG. 11. This being the case, ID information {"ID1", "ID information input unit 2b", "$t_{10}$"} is input to the state update means 32 from the ID information input unit 2. Here, "ID information input unit 2b" is an ID information input unit number.

Next, the state update means 32 acquires the position information (i.e. combination of the position coordinate of the mobile object and the detection time of the position coordinate) from the position information input unit 1 (step S2). At the time $t_{10}$, position information {"$p_{10a}$", "$t_{10}$"} and {"$p_{10b}$", "$t_{10}$"} are input as shown in FIG. 10.

Though FIG. 3 shows the case where the ID information and the position information are input to the observed information reflection means 322 in the state update means 32, the ID information and the position information may be input to any of the state estimation means 321 and the observed information reflection means 322 so long as the state estimation means 321 can reference to the position information and the observed information reflection means 322 can reference to the ID information and the position information.

Next, the state estimation means 321 in the state update means 32 acquires the state information of the most recent time (i.e. state information created at the time immediately preceding the current time) among the state information stored in the state storage unit 31, from the state storage unit 31 (step S3). As mentioned earlier, the state information is the combination of the time, the mobile object ID, and the position-score correspondence information of the mobile object at the time.

In step S3, the state estimation means 321 may check the time of each piece of state information stored in the state storage unit 31, select a state information group of a latest time, and read the state information from the state storage unit 31. In this example, the state estimation means 321 reads a state information group created at the previous time $t_9$.

The state update means 32 determines, for the state information group of the previous time acquired from the state storage unit 31, whether or not there is any state information from which state information of the current time ($t_{10}$) with an updated score state is not created (in detail, whether or not there is any state information on which steps S5 to S7 are not performed) (step S4).

In the case where there is any state information of the previous time from which the state information of the current time with the updated score is not created (step S4: Yes), the state estimation means 321 selects one piece of unprocessed state information from the state information group of the previous time read in step S3. Here, suppose the state information of ID1 is selected. Note that means for performing the determination of step S4 and the selection may be provided in the state update means 32 separately from the state estimation means 321 and input the selected state information to the state estimation means 321.

The state estimation means 321 calculates an elapsed period from the time of the selected state information to the current time, determines a score propagation range based on a predefined mobile object mobility model, and propagates the score in the position-score correspondence information included in the selected state information to estimate the score state of the current time (step S5). In this example, since the current time is $t_{10}$, the score in the position-score correspondence information (see FIG. 12(a)) of ID1 created at the time $t_9$ immediately preceding the current time is propagated. In step S5, instead of overwriting the score in the position-score correspondence information included in the selected state information, the state estimation means 321 creates a copy of the position-score correspondence information included in the selected state information, and performs a process of propagating the score to its neighboring position(s) according to the predetermined mobility model in the copied position-score correspondence information. As a result, the position-score correspondence information of the current time is newly created, while keeping the position-score correspondence information of the previous time without change.

The process of propagating the score is described below. This example uses a mobility model (see FIG. 4(a)) of propagating the score of each cell to its adjacent upper, lower, left, and right cells per time step. The cycle in which the position information input unit 1 and the ID information input unit 2 detect the position coordinate and the ID and input the position coordinate and the ID to the state update means 32 is assumed to be one time step. Accordingly, in this example, the state estimation means 321 sets the score of each cell at the time $t_9$ as the score of its adjacent upper, lower, left, and right cells, and determines this score propagation result as the result of estimating the score of each position at the time $t_{10}$ (position-score correspondence information estimation result). Here, the state estimation means 321 propagates the score of every individual cell to its upper, lower, left, and right cells. Since the scores of the adjacent upper, lower, left, and right cells are propagated to each cell, four scores are propagated to one cell. The state estimation means 321 sets a maximum score of the four cells as the score of the cell.

Note that the mobility model is not limited to the above-mentioned mobility model, and may be appropriately defined according to, for example, the mobility characteristics of the mobile object to be tracked.

FIG. 13(a) shows the estimation result of the position-score correspondence information of the time $t_{10}$ created as a result of the process of propagating the score of each cell at the time $t_9$ based on the mobility model. FIGS. 12(a) and 13(a) both relate to the selected ID1. FIGS. 14(a) and 15(a) described later equally relate to ID1.

The state estimation means 321 inputs the estimation result (see FIG. 13(a)) of the position-score correspondence information of the current time created in step S5, to the observed information reflection means 322. In detail, the state estimation means 321 inputs the combination (i.e. state information) of the estimation result of the position-score correspondence information, the previous time, and the selected ID (ID1 in this example), to the observed information reflection means 322.

The observed information reflection means 322 updates the estimated position-score correspondence information of the current time, using the position-score correspondence information of the current time estimated by the state estimation means 321, the ID information input from the ID information input unit 2, and the position information input from the position input unit 1. The observed information reflection means 322 performs the update by overwriting the estimation result of the position-score correspondence information input from the state estimation means 321.

The observed information reflection means 322 first updates the position-score correspondence information of the current time estimated by the state estimation means 321, based on the ID information of the current time input from the ID information input unit 2 (step S6). In step S1, {"ID1", "ID information input unit 2b", "$t_{10}$"} is input as the ID information observed at $t_{10}$ which is the current time. This ID information indicates that the ID information input unit 2b detects "ID1" at the time $t_{10}$.

In step S6, based on the ID information acquired from the ID information input unit 2, the observed information reflection means 322 updates the position-score correspondence information of the current time estimated by the state estimation means 321 so that the amount of score increase of the cell corresponding to the ID detection area set for the ID information input unit 2 detecting the mobile object ID is larger than the amount of score increase of the other cell. In this example, in the position-score correspondence information shown in FIG. 13(a), the observed information reflection means 322 adds 0.3 to the score of the cell corresponding to the ID detection area Rb of the ID information detection device 2b, while maintaining the score of the other area without change. As a result of this operation, the position-score correspondence information shown in FIG. 13(a) is updated as shown in FIG. 14(a). As shown in FIG. 14(a), the score of each cell corresponding to the ID detection area Rb is higher than in the state shown in FIG. 13(a), while the scores of the other cells are the same as in the state shown in FIG. 13(a).

Next, the observed information reflection means 322 updates the position-score correspondence information (see FIG. 14(a)) after the process of step S6, based on the position information input from the position information input unit 1 (step S7). In step S2, {"$p_{10a}$", "$t_{10}$"} and {"$p_{10b}$", "$t_{10}$"} are input as the position information observed at $t_{10}$ which is the current time. The observed information reflection means 322 performs the update process of step S7 using all position information of the current time input in step S2.

The observed information reflection means 322 determines, using each position coordinate included in the position information acquired from the position information input unit 1, which cell in the tracking area includes the position coordinate. In this example, the observed information reflection means 322 determines $c(9, 1)$ as the cell including the position coordinate $p_{10a}$, and $c(10, 7)$ as the cell including the position coordinate $p_{10b}$.

The observed information reflection means 322 updates the position-score correspondence information so that the amount of score increase of the cell corresponding to the detected position coordinate is larger than the amount of score increase of the other cell. In this example, the observed information reflection means 322 maintains the scores of the cells $c(9, 1)$ and $c(10, 7)$ in which the position coordinates are detected without change, and subtracts 0.3 from each of the scores of the other cells in which no position coordinate is detected. As a result of this operation, the position-score correspondence information shown in FIG. 14(a) is updated as shown in FIG. 15(a).

In addition to updating the position-score correspondence information, the observed information reflection means 322 updates the time included in the state information to the current time. Though the observed information reflection means 322 updates the time included in the state information to the current time here, the state estimation means 321 may perform the process of updating the time included in the state information to the current time. For example, the state estimation means 321 may update the time included in the state information to the current time, after performing the score propagation process in step S5.

As a result of the observed information reflection means 322 performing the position-score correspondence information update process (steps S6 and S7) for the state information input from the state estimation means 321, the state information of the current time relating to the selected ID1 is created.

The state update means 32 thus completes the creation of the state information of the current time for ID1 in the state information group acquired in step S3.

The above-mentioned process of steps S5 to S7 is the process of creating the state information of the current time based on the state information of the previous time for one ID.

After step S7, the state update means 32 returns to step S4, and determines whether or not there is any unprocessed state information with regard to steps S5 to S7. In this example, the state information of ID2 is unprocessed, so that the state update means 32 performs the process of steps S5 to S7 on the state information of ID2 in the same way as ID1. FIG. 12(b) shows an example of the position-score correspondence information of ID2 created at the previous time $t_9$. In step S5, the state estimation means 321 performs a process of propagating the score of each cell shown in the position-score correspondence information, as a result of which the position-score correspondence information shown in FIG. 13(b) is obtained. This is the estimation result of the position-score correspondence information at the time $t_{10}$. Following this, the observed information reflection means 322 updates the estimation result of the position-score correspondence information, based on the ID information (step S6). FIG. 14(b) shows the update result. Since ID2 is not detected at the current time $t_{10}$ in this example, for ID2 there is no change of the position-score correspondence information by step S6 (see FIGS. 13(b) and 14(b)). The observed information reflection means 322 then updates the position-score correspondence information after step S6, based on the position information (step S7). In detail, the observed information reflection means 322 maintains the scores of the cells c(9, 1) and c(10, 7) in which the position coordinates are detected without change, and subtracts a value from each of the scores of the other cells in which no position coordinate is detected, as in the case of ID1. FIG. 15(b) shows the result.

After step S7, the state update means 32 returns to step S4. In the case of determining that there is no unprocessed state information with regard to steps S5 to S7 (step S4: No), the observed information reflection means 322 stores the state information of the current time created for each ID by repeatedly performing the process of steps S5 to S7, in the state storage unit 31 (step S8). The state information includes the detection time included in the position information or the ID information acquired from the position information input unit 1 or the ID information input unit 2, the mobile object ID, and the position-score correspondence information created by the process of steps S5 to S7.

Next, the definite state selection means 331 in the flow line specification means 33 reads state information of each ID for a past predetermined period from the current time (step S9). In this example, the definite state selection means 331 reads all state information (state information from the time $t_1$ to the time $t_{10}$) stored in the estate storage unit 31. Alternatively, designation of a time range for specifying a flow line may be received so that the definite state selection means 331 reads state information corresponding to the designated time range.

After step S9, the definite state selection means 331 determines whether or not there is any state information group of an ID for which a process (i.e. steps S11 to S14) of reflecting a score of a definite time in a score of an indefinite time is not performed, among the state information read from the state storage unit 31 (step S10). In this example, a state information group of ID1 and a state information group of ID2 are included in the state information read from the state storage unit 31.

In the case where there is any state information group of an ID for which a process of reflecting a score of a definite time in a score of an indefinite time is not performed (step S10: Yes), the definite state selection means 331 selects one ID, and selects definite state information of the selected ID (step S11). Here, suppose "ID1" is selected as the ID. It is also assumed that a criterion that "state information created at a most recent time is set as definite state information" is given beforehand, and the definite state selection means 331 selects, as definite state information, state information created at a most recent time from the state information group of ID1, according to the criterion. This being the case, the state information of ID1 including the position-score correspondence information of the time $t_{10}$ shown in FIG. 15(a) is selected as the definite state information. Hence, the time $t_{10}$ included in the definite state information is a definite time, and the other times $t_1$ to $t_9$ are each an indefinite time.

After step S11, the definite state reflection means 332 determines whether or not there is any state information of an indefinite time (hereafter referred to as indefinite state information) in the state information group of the selected "ID1" (step S12).

In the case where there is any indefinite state information (step S12: Yes), the definite state reflection means 332 estimates the score state of the indefinite time $(t_9)$ nearest the definite time $(t_{10})$, by performing a process of propagating the score of each cell in the position-score correspondence information included in the definite state information (step S13). The score propagation process is the same as that in step S5. In detail, the definite state reflection means 332 creates a copy of the position-score correspondence information of the definite time $(t_{10})$, and performs a process of propagating the score to its neighboring position(s) according to a predetermined mobility model in the copied position-score correspondence information. The result is the position-score correspondence information of the nearest time estimated based on the position-score correspondence information of the definite time.

Next, the definite state reflection means 332 selects the state information of the indefinite time ($(t_9$ in this example) nearest the definite time. The definite state reflection means 332 then reflects the position-score correspondence information of the time estimated in step S13, in the position-score correspondence information included in the indefinite state information (step S14). In step S14, the definite state reflection means 332 may add the score of each cell in the position-score correspondence information estimated in step S13, to the score of the corresponding cell in the position-score correspondence information included in the selected indefinite state information. As an alternative, the definite state reflection means 332 may multiply, by the score of each cell in the position-score correspondence information estimated in step S13, the score of the corresponding cell in the position-score correspondence information included in the selected indefinite state information. As another alternative, the definite state reflection means 332 may multiply the score of each cell in the position-score correspondence information estimated in step S13 by a weight coefficient and then perform the above-mentioned addition or multiplication. The result of this operation is used as the score of each cell at the indefinite time nearest the definite time, to update the position-score correspondence information of the indefinite time.

The definite state reflection means 332 sets the state information of the indefinite time as a result of the process in step S14, as definite state information. Hence, the time $t_9$ is treated as a definite time.

After step S14, the flow line specification means 33 returns to step S12, to determine whether or not there is any indefinite state information in the state information group of the selected "ID1". Here, the state information of each of the times $t_1$ to $t_8$ is indefinite state information. The definite state reflection means 332 accordingly performs a process of propagating the score of each cell in the position-score correspondence information of the time $t_9$, to estimate the score state of the indefinite time ($t_8$) nearest the definite time (step S13). The definite state reflection means 332 then selects the state information of the indefinite time ($t_8$) nearest the definite time ($t_{10}$, $t_9$), and reflects the position-score correspondence information of the time estimated in step S13, in the position-score correspondence information included in the indefinite state information (step S14). The definite state reflection means 332 sets the state information of the time $t_8$, as definite state information.

Subsequently, the definite state reflection means 332 equally repeats the process of steps S13 and S14 until there is no indefinite state information.

When all state information relating to "ID1" which is the selected ID are set as definite state information (step S12: No), the flow line specification means 33 returns to step S10. Since the process of steps S11 to S14 is not performed on "ID2", the flow line specification means 33 goes to step S11. The definite state selection means 331 selects ID2, and selects definite state information of ID2 (step S11). The process of steps S12 to S14 is repeatedly performed as in the case where ID1 is selected, to reflect a score of a definite time on a score of an indefinite time.

When there is no more indefinite state information of ID2, the flow line specification means 33 returns to step S10. Once the definite state selection means 331 determines that there is no ID for which the process of steps S11 to S14 is not performed (step S10: No), the mobile object position detection means 333 specifies a flow line using the state information group of each ID (step S15).

In step S15, the mobile object position detection means 333 specifies the flow line for each ID. As a method of determining the order, i.e. from which ID the flow line is to be specified, a method of random ID selection may be used. Alternatively, ID selection may be performed in order in which the score during a past predetermined period from the current time has a strongest peak, to specify the flow line.

After selecting the ID, the mobile object position detection means 333 references to the position-score correspondence information of the ID at each time, and detects a cell having a peak score at each time. In the case of detecting the cell having the peak score at a given time, the mobile object position detection means 333 may simply detect a cell having a maximum score. Alternatively, the mobile object position detection means 333 may detect a cell corresponding to a center of gravity of each cell whose score is equal to or more than a predetermined value (threshold), as the cell having the peak score. The process of detecting the cell having the peak score may be performed from any of the times. The mobile object position detection means 333 determines that the mobile object corresponding to the selected ID exists in the detected cell at each time, and sets the combination of each time and the position coordinate of the corresponding cell coordinate as information indicating the flow line of the mobile object (step S15).

Thus, the flow line is represented by the position coordinate of the cell obtained by dividing the tracking area in a grid. That is, the resolution of the position coordinate of the flow line depends on the resolution of the cell obtained by grid division.

In the case of selecting each ID in the order in which the score has a strongest peak during the past predetermined period from the current time and specifying the flow line in step S15, it is preferable to select, for a flow line created later, a cell other than a cell of a flow line created earlier. Such cell selection contributes to improved flow line accuracy. In this example, regarding ID2, the same peak score appears for the mobile objects a and b in any state of the times $t_1$ to $t_{10}$. In such a case, the flow line may be specified for ID1 first and, when specifying the flow line of ID2, the flow line may be specified by tracing a cell other than a cell selected for ID1.

The mobile object position detection means 333 instructs the flow line output unit 4 to display the flow line formed by connecting the position coordinates of the cells in order of time, for each ID (step S16). Here, the mobile object position detection means 333 may instruct the flow line output unit 4 to display the flow line formed by connecting the areas of the cells selected at the respective times in a time series. The mobile object position detection means 333 also instructs the flow line output unit 4 to display the ID corresponding to the flow line, together with the flow line.

Suppose a flow line is created by simply tracing the peak score from the past to the current time. Since there is no difference in score between the state of ID1 and the state of ID2 from the time $t_1$ to the time $t_9$, which mobile object is to be assigned which ID can be determined only at the time $t_{10}$. That is, it is impossible to uniquely specify and assign the correct ID to the flow line from the time $t_1$ to the time $t_9$. In the present invention, however, the definite state information is selected in step S11, and the score of the definite time is reflected in the score of the indefinite time (steps S13 and S14). This creates a difference in score between the position-score correspondence information of ID1 and the position-score correspondence information of ID2 even from the time $t_1$ to the time $t_9$, so that the flow line can be specified accurately.

The above description relates to the process in the case where the state update means 32 and the flow line detection means 33 operate synchronously. In the case where the state update means 32 and the flow line detection means 33 operate asynchronously, the state update means 32 repeatedly performs the process of steps S1 to S8 (see FIG. 7) and, asynchronously with this process, the flow line detection means 33 repeatedly performs the process of steps S9 to S16.

The above exemplary embodiment describes the case where the ID can be detected from every mobile object existing in the tracking area. However, a flow line can also be detected for a mobile object having no ID in the exemplary embodiment. A procedure of detecting a flow line of a mobile object having no ID is described below. A mobile object having no ID is hereafter referred to as an unknown, and position-score correspondence information of the mobile object having no ID as position-score correspondence information of the unknown. Position-score correspondence information of all unknowns is stored as single information in the state storage unit 31, for each time. That is, even when there are a plurality of unknowns, only one piece of position-score correspondence information of the unknowns needs to be prepared at each time. The state estimation means 321 in the state update means 32 acquires state information of each unknown created at a previous time, from the state storage unit 31 (step S3). The state estimation means 321 propagates the score according to the mobile object mobility model as in the case of the other mobile object having an ID, to estimate the position-score correspondence information of the current time from the position-score correspondence information of the previous time (step S5). Since there is no observed ID information, the observed information reflection means 322 does not perform the process of step S6. The observed information reflection means 322 updates the state using the observed position information (step S7). The flow line specification means 33 performs the flow line detection process of the unknown, after detecting the flow line of each mobile object having an ID (steps S10 to S15). In detail, first, the flow line specification means 33 reflects, for the position-score correspondence information of the mobile object having the ID, the score of the position-score correspondence information of the definite time in the score of the indefinite time (steps S13 and S14), selects the peak score at each time, and creates the flow line (step S15). After this, the mobile object position detection means 333 determines that, among a cell group having a peak score in the position-score correspondence information of the unknown at each time, a cell group remaining after excluding each cell selected for each mobile object having the ID at each time is the position where each unknown exists. Connecting these cells in a time series can yield the flow line of the mobile object having no ID. Regarding how many peaks are detected from the position-score correspondence information of the unknown, each cell having a score higher than a predefined threshold may be selected as a peak, or each cell within n cells in descending order of score may be selected as a peak.

According to this exemplary embodiment, the state update means 32 acquires the state information created at the previous time from the state storage unit 31, creates the state information of the current time based on the acquired state information, the mobile object mobility model, and the observed information of the position and the ID, and stores the created state information in the state storage unit 31. Further, the flow line specification means 33 acquires the state information for the past predetermined period from the current time from the state storage unit 31, and creates the flow line by reflecting the score from the time at which the position of the mobile object identified by the ID is definite to the time at which the position of the mobile object is indefinite.

Thus, the position information and the ID information observed by the sensors (the position information input unit 1 and the ID information input unit 2) are converted to the state in which the level of possibility of existence at each position in the tracking area is expressed as the score, and stored. As a result, even in the case where tracking is frequently interrupted, the flow line can be detected robustly because the previously observed sensor information (position information and ID information) is reflected in the score. Moreover, the flow line of each mobile object can be uniquely determined merely by tracing the peak score of each time for the state information group of the ID. This eliminates the need to create a flow line hypothesis using every combination of position information and ID information detected during the past predetermined period from the current time and calculate a likelihood for each hypothesis to estimate the flow line. Since the number of combinations as flow line hypotheses does not increase even when the number of mobile objects to be tracked increases in this exemplary embodiment, the present invention achieves real-time processing without a steep increase in computational complexity.

Exemplary Embodiment 2

In Exemplary Embodiment 2, the division area (e.g. cell) in the tracking area 50 where the score is set does not have a fixed resolution but has a variable resolution.

Figure 17:
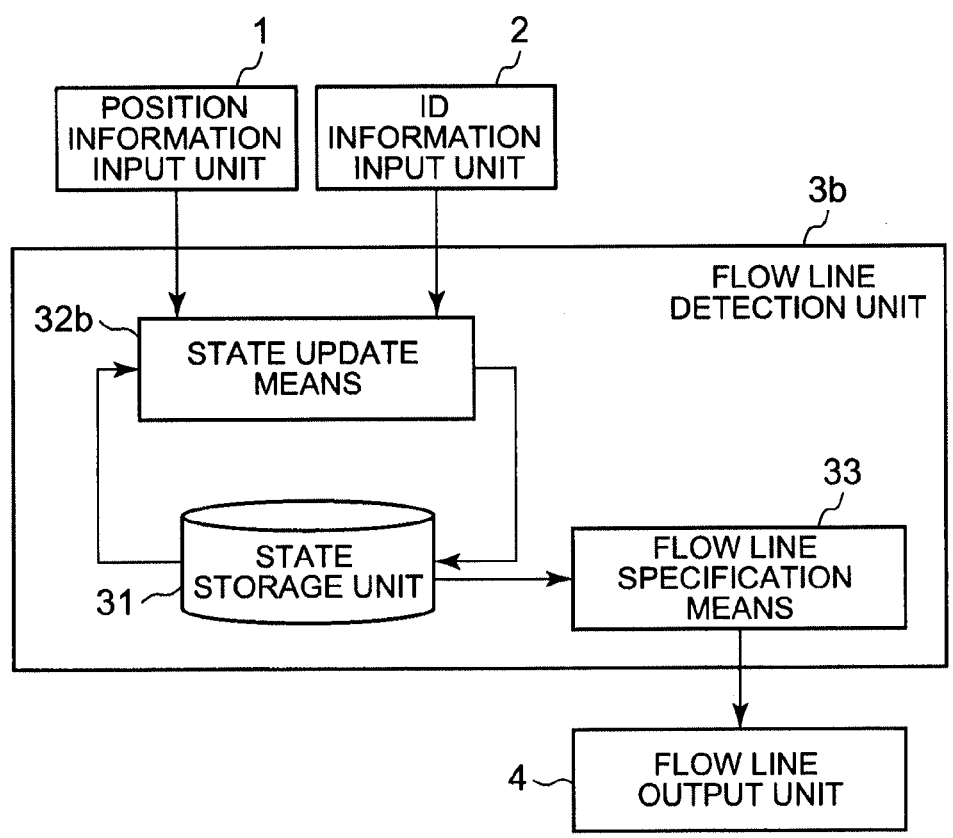
FIG. 17 is a block diagram showing an example of a flow line detection system in Exemplary Embodiment 2 of the present invention.

FIG. 17 is a block diagram showing an example of a flow line detection system in Exemplary Embodiment 2 of the present invention. The flow line detection system in Exemplary Embodiment 2 includes the position information input unit 1, the ID information input unit 2, a flow line detection unit 3b, and the flow line output unit 4. The position information input unit 1, the ID information input unit 2, and the flow line output unit 4 are the same as those in Exemplary Embodiment 1, and so their detailed description is omitted.

The flow line detection unit 3b includes state update means 32b, the state storage unit 31, and the flow line specification means 33. The state storage unit 31 is the same as that in Exemplary Embodiment 1, and so its detailed description is omitted.

Figure 18:
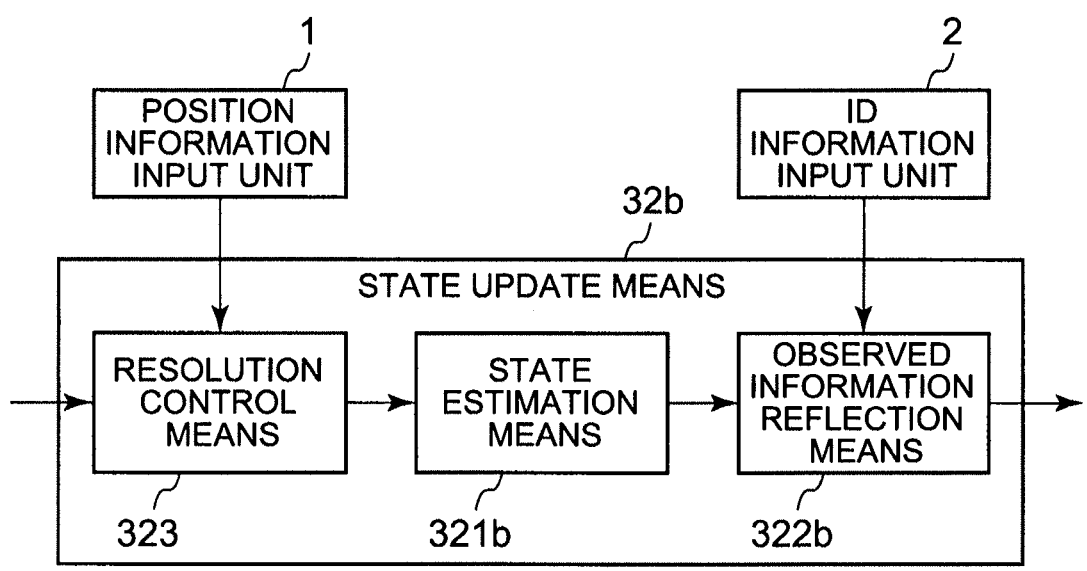
FIG. 18 is a block diagram showing an example of a structure of state update means in Exemplary Embodiment 2.

FIG. 18 is a block diagram showing an example of a structure of the state update means 32b in Exemplary Embodiment 2. The state update means 32b includes resolution control means 323, state estimation means 321b, and observed information reflection means 322b. The state estimation means 321b and the observed information reflection means 322b are the same as the state estimation means 321 and the observed information reflection means 322 in Exemplary Embodiment 1.

The resolution control means 323 calculates a distance relating to the position coordinate of each mobile object input from the position information input unit 1. The resolution control means 323 controls the resolution of the division area according to the distance. In detail, the resolution control means 323 redefines the division area of the tracking area 50 so as to change in size the division area of the tracking area 50 (see FIG. 1), and sets the score for each redefined area again.

The following describes an example where the tracking area 50 is divided in a grid into each cell as shown in FIG. 9, for simplicity's sake. To increase the resolution, the cell is redefined so as to decrease the cell size (e.g. the length of each side). To decrease the resolution, the cell is redefined so as to increase the cell size.

In the case where the distance between mobile objects to be tracked is short, it is impossible to separate the mobile objects and detect the peak score of each mobile object unless the position-score correspondence information is created with a high resolution. Therefore, the resolution control means 323 controls the resolution in the position-score correspondence information according to the distance between mobile objects at each time so that the flow line specification means 33 can separate the mobile objects and detect their flow lines.

For example, suppose the position-score correspondence information indicates the correspondence between the cell expressed as the two-dimensional coordinate value and the score. The resolution control means 323 selects two pieces of position information among the position information of each mobile object input from the position information detection unit 1, and calculates the distance in the x-axis direction and the distance in the y-axis direction between the position coordinates included in the selected two pieces of position information. Likewise, the resolution control means 323 selects each combination of two pieces of position information in sequence, and calculates the distance in the x-axis direction and the distance in the y-axis direction between position coordinates for each combination. Having calculated the distance in the x-axis direction and the distance in the y-axis direction between two points for all combinations, the resolution control means 323 redefines the cell size so that the resolution is higher than the shortest distance of the calculated distances. This enables the positions of the mobile objects to be reliably separated to create the position-score correspondence information. Setting the resolution higher than the shortest distance means, for example, setting the length of one side of the cell shorter than the shortest distance.

There is also an instance where the distance between the mobile objects temporarily approaches 0, such as when the mobile objects pass each other. In such an instance, if the resolution is changed using the calculation result of the distance between the mobile objects at each time, it is necessary to create the position-score correspondence information of a highest possible resolution whenever the mobile objects approach each other. In view of this, instead of changing the resolution using the distance calculated at one time step, in the case of updating the resolution to a higher value (in the case of decreasing the division area in size), the resolution may be updated to a higher value on a condition that a state in which the shortest distance between the mobile objects is shorter than the resolution of the previous time continues for a predetermined period or more. Likewise, in the case of updating the resolution to a lower value (in the case of increasing the division area in size), the resolution may be updated to a lower value on a condition that a state in which the shortest distance between the mobile objects is longer than the resolution of the previous time continues for a predetermined period or more.

Having determined the resolution used for the current time through the use of the position information acquired from the position information input unit 1, the resolution control means 323 updates the resolution of the state information group of the previous time acquired from the state storage unit 31, to the determined resolution. The resolution control means 323 determines the score of each cell of the new resolution, based on the score in each piece of position-score correspondence information included in the state information group of the previous time. The resolution control means 323 thus creates position-score correspondence information obtained by updating the position-score correspondence information of the previous time according to the resolution of the current time. This process can be regarded as a process of updating the resolution of the position-score correspondence information of the previous time. In the resolution update process, instead of updating the position-score correspondence information of the previous time by overwriting, position-score correspondence information obtained by adjusting the position-score correspondence information of the previous time to the resolution of the current time is newly created. The resolution control means 323 inputs the created position-score correspondence information to the state estimation means 321b. The state estimation means 321b and the observed information reflection means 322b perform the respective processes on this position-score correspondence information, as a result of which the position-score correspondence information of the current time is completed. In the case of determining not to change the resolution, on the other hand, the resolution control means 323 creates a copy of the position-score correspondence information of the previous time and inputs the copy to the state estimation means 321b.

After creating the position-score correspondence information obtained by updating the position-score correspondence information of the previous time according to the resolution of the current time, the resolution control means 323 inputs the combination of the time (i.e. previous time) included in the state information of the previous time, the ID, and the position-score correspondence information to the state estimation means 321b as state information. Thus, the position-score correspondence information is input to the state estimation means 321b together with the time and the ID, as state information. Here, the resolution control means 323 also inputs each piece of position information of the current time input from the position information input unit 1, to the state estimation means 321b together with the state information.

When the state information and the position information of the mobile object are input from the resolution control means 323, the state estimation means 321b performs a process of propagating the score in the position-score correspondence information included in the state information according to the mobility model. This process is the same as the process of the state estimation means 321 in Exemplary Embodiment 1, and can be regarded as a process of estimating the position-score correspondence information of the current time. The state estimation means 321b inputs the state information including the position-score correspondence information for which the score propagation process is performed and the position information of the mobile object, to the observed information reflection means 322b.

The observed information reflection means 322b receives the input of the ID information of the current time from the ID information input unit 2. The observed information reflection means 322b creates the state information of the current time using the ID information of the current time and the state information and the position information of the current time input from the state estimation means 321b, and stores the created state information in the state storage unit 31. That is, the observed information reflection means 322b reflects the ID information of the current time and the position information of the current time, in the position-score correspondence information included in the input state information. This process is the same as the process of the observed information reflection means 322 in Exemplary Embodiment 1. The observed information reflection means 322b stores the state information including the position-score correspondence information in which the ID information and the position information of the current time are reflected, in the state storage unit 31 as the state information of the current time.

Though FIG. 18 shows the case where the position information is input to the resolution control means 323 and the ID information is input to the observed information reflection means 322b, the position information and the ID information may be input to any means in the state update means 32b so long as the resolution control means 323 and the state estimation means 321b can reference to the position information and the observed information reflection means 322b can reference to the position information and the ID information.

The flow line specification means 33 includes the definite state selection means 331, the definite state reflection means 332, and the mobile object position detection means 333, as in Exemplary Embodiment 1. These means are the same as those in Exemplary Embodiment 1. In detail, the definite state reflection means 332 propagates the score of each position according to the mobility model, for the position-score correspondence information of the definite time. The definite state reflection means 332 reflects the position-score correspondence information after this process, in the position-score correspondence information of the nearest indefinite time. In Exemplary Embodiment 2, however, there is an instance where the resolution differs between these pieces of position-score correspondence information. In such a case, the definite state reflection means 332 performs the process of reflecting the position-score correspondence information after the score propagation process in the position-score correspondence information of the nearest indefinite point, by a method according to the resolution difference.

The flow line specification means 33 is the same as that in Exemplary Embodiment 1 on the other points. The flow line specification means 33 acquires the state information of each ID created during the past predetermined period from the current time from the state storage unit 31, and specifies the flow line for each ID.

In Exemplary Embodiment 2, the state update means 32b (the state estimation means 321b, the observed information reflection means 322b, and the resolution control means 323) and the flow line specification means 33 (the definite state selection means 331, the definite state reflection means 332, and the mobile object position detection means 333) are realized, for example, by a CPU of a computer operating according to a flow line detection program. In this case, the flow line detection program may be stored in a program storage device (not shown) of the computer, with the CPU reading the program and, according to the program, operating as the state update means 32b (the state estimation means 321b, the observed information reflection means 322b, and the resolution control means 323) and the flow line specification means 33 (the definite state selection means 331, the definite state reflection means 332, and the mobile object position detection means 333). The state update means 32b and the flow line specification means 33 may be each realized by separate hardware. The state estimation means 321b, the observed information reflection means 322b, and the resolution control means 323 may be each realized by separate hardware.

Figure 19:
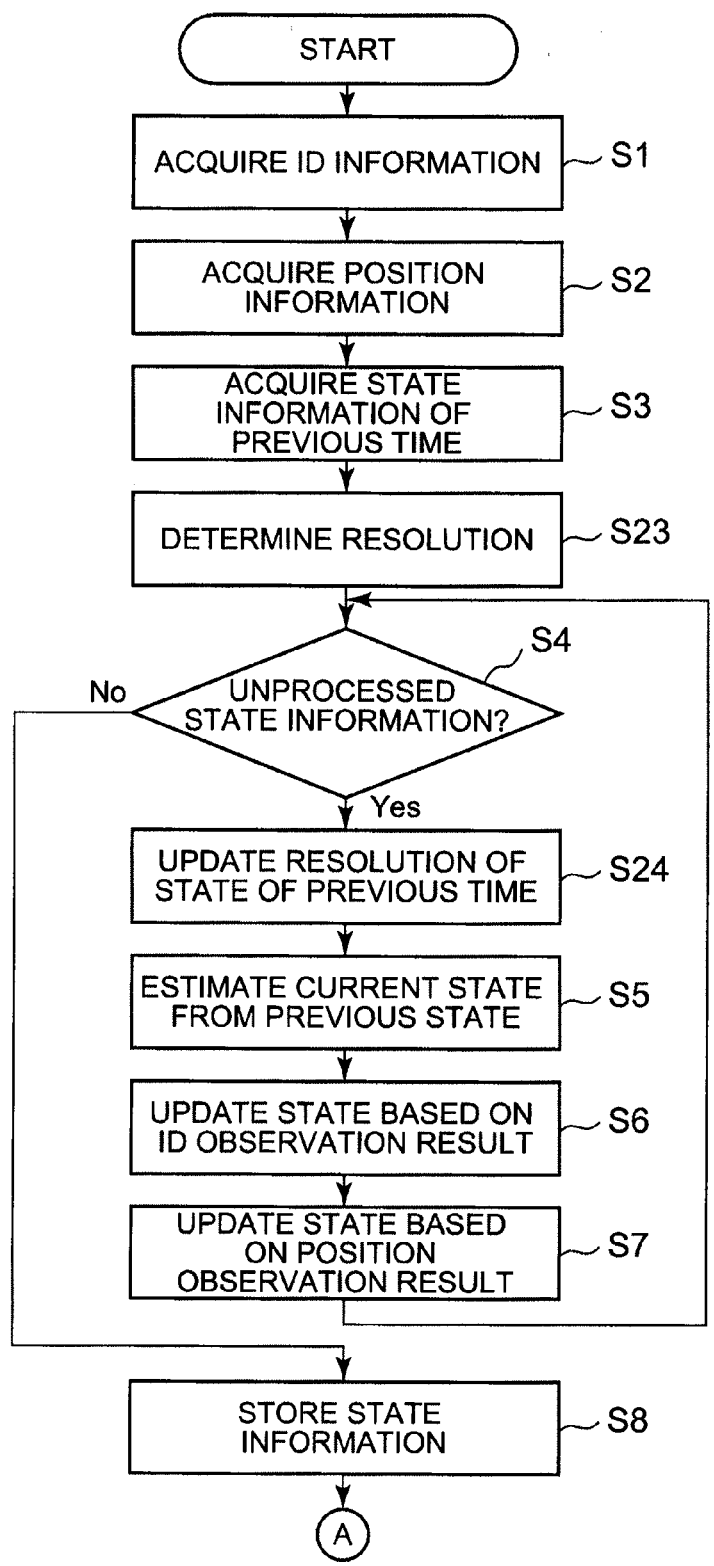
FIG. 19 is a flowchart showing an example of a process of the flow line detection unit in Exemplary Embodiment 2.
Figure 20:
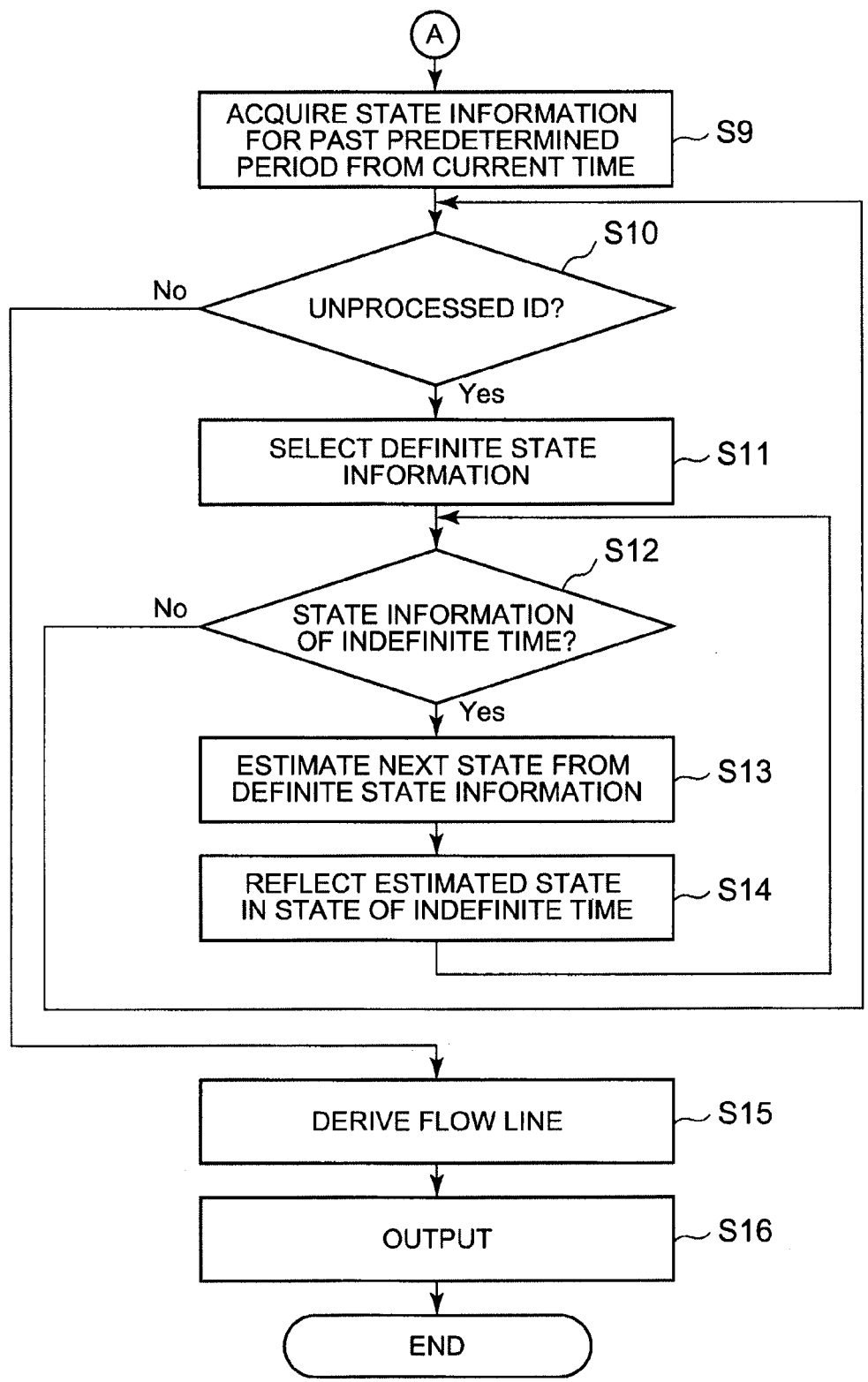
FIG. 20 is a flowchart showing an example of a process of the flow line detection unit in Exemplary Embodiment 2.

The following describes operations in Exemplary Embodiment 2. FIGS. 19 and 20 are flowcharts showing an example of the process of the flow line detection unit 3b in Exemplary Embodiment 2. The example of the process in Exemplary Embodiment 2 is described below, while showing a specific example in FIGS. 21 and 22. In the flowcharts shown in FIGS. 19 and 20, the same processes as in Exemplary Embodiment 1 are given the same signs as in FIGS. 7 and 8, and their detailed description is omitted.

First, the state update means 32b acquires the ID information (i.e. combination of the mobile object ID, the ID information input unit number, and the detection time of the ID) from the ID information input unit 2 (step S1).

Next, the state update means 32b acquires the position information (i.e. combination of the position coordinate of the mobile object and the detection time of the position coordinate) from the position information input unit 1 (step S2).

Next, the resolution control means 323 in the state update means 32b acquires the state information of the most recent time (i.e. state information created at the time immediately preceding the current time) among the state information stored in the state storage unit 31, from the state storage unit 31 (step S3).

Next, the resolution control means 323 determines the resolution when creating the position-score correspondence information of the current time, using the position information of each mobile object acquired in step S2 (step S23). The resolution control means 323 then creates the position-score correspondence information which includes identification information (e.g. cell coordinate) of each cell obtained by dividing the tracking area according to the resolution and in which the score associated with the coordinate of each cell is undefined.

Figure 21:
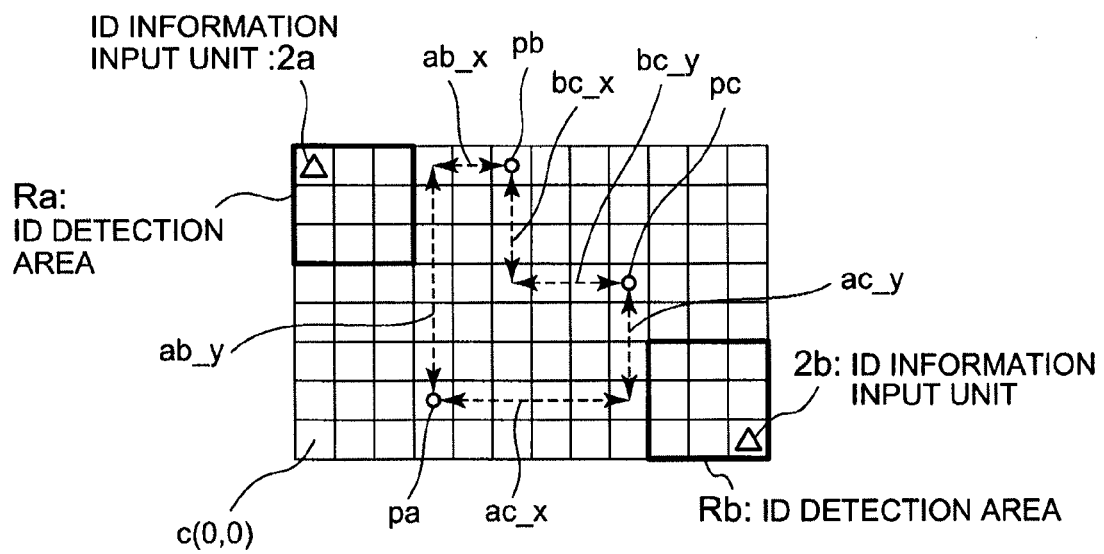
FIG. 21 is an explanatory diagram showing an example of resolution control.
Figure 22:
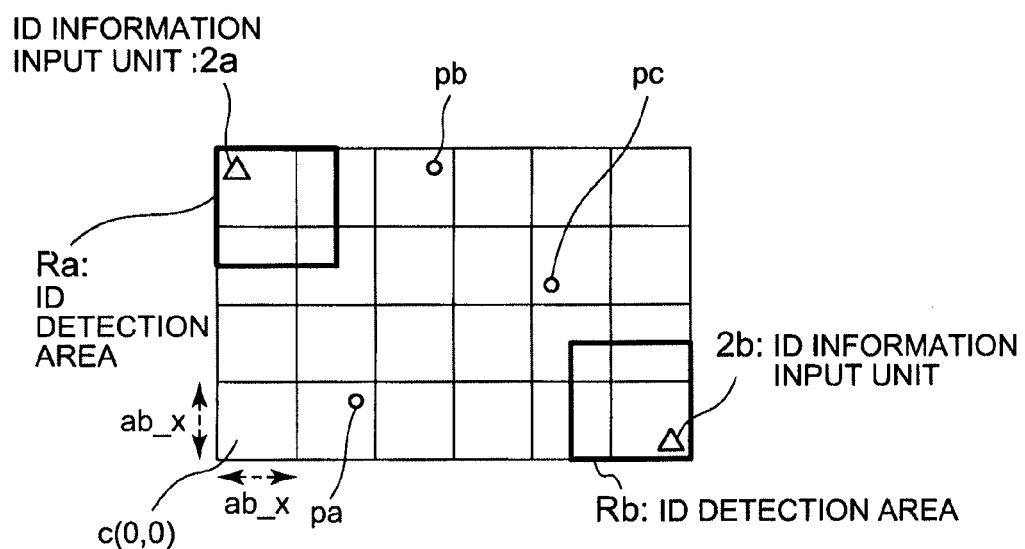
FIG. 22 is an explanatory diagram showing an example of resolution control.

A specific example of the process of step S23 is described below, with reference to FIGS. 21 and 22. Suppose position coordinates of three mobile objects denoted by pa, pb, and pc are detected as shown in FIG. 21. The resolution control means 323 calculates the distance in the x-axis direction and the distance in the y-axis direction between pa and pb, between pb and pc, and between pc and pa. In FIG. 21, the distance in the x-axis direction between pa and pb is denoted by ab_x, and the distance in the y-axis direction between pa and pb is denoted by ab_y. Likewise, the distance in the x-axis direction between pb and pc is denoted by bc_x, and the distance in the y-axis direction between pb and pc is denoted by bc_y. Likewise, the distance in the x-axis direction between pc and pa is denoted by ac_x, and the distance in the y-axis direction between pc and pa is denoted by ac_y. The resolution control means 323 calculates the distance in the x-axis direction and the distance in the y-axis direction between two position coordinates for all combinations, and selects a shortest distance. In the example shown in FIG. 21, ab_x is the shortest distance. In step S23, this distance of ab_x is determined as a new resolution as shown in FIG. 22.

Here, an upper limit and a lower limit of the resolution may be defined beforehand. The upper limit of the resolution corresponds to a highest value of resolution, where the resolution as the cell size or the like is minimum. The lower limit of the resolution corresponds to a lowest value of resolution, where the resolution as the cell size or the like is maximum. In the case where the distance between the two position coordinates is shorter than the upper limit of the resolution, the upper limit may be set as the resolution of the current time. In the case where the distance between the two position coordinates is longer than the lower limit of the resolution, the lower limit may be set as the resolution of the current time. The upper limit of the resolution may be determined based on the resolution of the position coordinate input from the position information input unit 1. The lower limit of the resolution may be determined based on the state in which each ID detection area in the tracking area belongs to a different cell.

Next, the state update means 32b determines, for the state information group of the previous time acquired from the state storage unit 31, whether or not there is any state information from which state information of the current time with an updated score state is not created (in detail, whether or not there is any state information on which steps S24, S5, S6, and S7 are not performed) (step S4).

In the case where there is any state information of the previous time from which the state information of the current time with the updated score is not created (step S4: Yes), for example, the resolution control means 323 selects one piece of unprocessed state information from the state information group of the previous time read in step S3. The resolution control means 323 creates position-score correspondence information by adjusting the position-score correspondence information of the previous time included in the state information to the resolution determined in step S23 (step S24). In detail, in the position-score correspondence information created in step S23, the resolution control means 323 sets the score corresponding to the identification information of each cell based on the position-score correspondence information of the previous time. That is, while the resolution is set to the resolution of the current time but the score is undefined in the position-score correspondence information created in step S23, the score is set in step S24.

The procedure of step S24 is described in detail below, with reference to FIGS. 21 and 22. The case of updating the resolution from finer to coarser resolutions is described first. In this description, it is assumed that FIG. 21 shows the cell state of the previous time whereas FIG. 22 shows the cell state of the current time. In the position-score correspondence information created in step S23, each cell shown in FIG. 22 is defined, but the score corresponding to each individual cell is undefined.

For each cell obtained by dividing the tracking area by the resolution determined in step S23, the resolution control means 323 determines which of the cells shown in the position-score correspondence information of the previous time is included in the cell. For example, of the cells (cells of the resolution of the current time determined in step S23) shown in FIG. 22, the cell $c(0, 0)$ is determined to include $c(0, 0), c(0, 1), c(1, 0)$, and $c(1, 1)$ from among the cells (cells shown in FIG. 21) shown in the position-score correspondence information of the previous time. The resolution control means 323 calculates a score mean value of the four cells $c(0, 0), c(0, 1), c(1, 0)$, and $c(1, 1)$ of the previous time (see FIG. 21) included in the cell $c(0, 0)$ of the current time (see FIG. 22), and determines the result as the score of the cell $c(0, 0)$ of the current time (see FIG. 22). The resolution control means 323 sets the determined score as the score of $c(0, 0)$, in the position-score correspondence information created in step S23. The resolution control means 323 equally calculates the score for each cell of the resolution of the current time, and includes the score in the position-score correspondence information.

In the above calculation example, the score mean value of the cells of the previous time included in the cell of the current time is determined as the score of the current time. Alternatively, the resolution control means 323 may determine a highest score of the cells of the previous time included in the cell of the current time, as the score of the cell of the current time. In the above-mentioned example, a highest score of the four cells $c(0, 0), c(0, 1), c(1, 0)$, and $c(1, 1)$ of the previous time shown in FIG. 21 may be determined as the score of the cell $c(0, 0)$ of the current time shown in FIG. 22.

The resolution control means 323 thus determines the score of each cell of the resolution of the current time and includes the determined score in the position-score correspondence information created in step S23, as a result of which the position-score correspondence information by adapting the position-score correspondence information of the previous time to the resolution of the current time can be obtained.

The case of updating the resolution from coarser to finer resolutions is described next. In this description, it is assumed that FIG. 22 shows the cell state of the previous time whereas FIG. 21 shows the cell state of the current time.

For each cell obtained by dividing the tracking area by the resolution determined in step S23, the resolution control means 323 determines which of the cells shown in the position-score correspondence information of the previous time includes the cell. The resolution control means 323 determines, as the score of the cell of the current time, the score of the cell of the previous time including the cell, and includes the determined score in the position-score correspondence information. For example, of the cells (cells of the resolution of the current time determined in step S23) shown in FIG. 21, the cell $c(0, 0)$ is included in $c(0, 0)$ from among the cells (cells shown in FIG. 22) shown in the position-score correspondence information of the previous time. The resolution control means 323 accordingly determines the score of the cell $c(0, 0)$ shown in FIG. 22 as the score of the cell $c(0, 0)$ of the current time shown in FIG. 21, and includes the determined score as the score of the cell $c(0, 0)$ of the current time in the position-score correspondence information. The resolution control means 323 equally determines the score for each cell of the resolution of the current time, and includes the score in the position-score correspondence information. As a result, the position-score correspondence information by adapting the position-score correspondence information of the previous time to the resolution of the current time can be obtained.

When changing the resolution between the previous time and the current time, there is a possibility that a cell defined at the current time extends over a plurality of cells defined at the previous time. In such a case, the resolution control means 323 may use a score mean value of the cells of the previous time over which the cell defined at the current time extends, as the score of the cell of the current time. The resolution control means 323 may also weight the score of each cell of the previous time over which the cell of the current time extends based on an area ratio at which the cell of the current time extends over the cells, and use a score mean value after weighting as the score of the cell of the current time.

The resolution control means 323 newly creates, as state information, the combination of the time (previous time) and the ID included in the state information selected in step S24 and the position-score correspondence information created in step S24, and inputs the created state information to the state estimation means $321b$. The resolution control means 323 also inputs the position information of the mobile object acquired in step S2, to the state estimation means $321b$.

Next, the state estimation means $321b$ calculates an elapsed period from the time (previous time) of the state information input from the resolution control means 323 to the current time, determines a score propagation range based on a predefined mobile object mobility model, and propagates the score in the position-score correspondence information included in the input state information to estimate the score state of the current time (step S5). The process of propagating the score in the position-score correspondence information is the same as step S5 in Exemplary Embodiment 1. In Exemplary Embodiment 2, however, the resolution of the position-score correspondence information is variable, so that it is desirable not to include the state resolution in parameters of the mobile object mobility model when defining the mobile object mobility model.

In step S5, after the score propagation process, the state estimation means $321b$ updates the time (previous time) in the input state information to the current time. The time included in the position information of the mobile object may be used as the current time in step S5. Though the case where the state estimation means $321b$ updates the time (previous time) in the state information to the current time is shown here, the process of updating the time in the state information to the current time may be performed by the observed information reflection means $322b$. For example, the observed information reflection means $322b$ may update the time included in the state information to the current time in step S7 or the like.

Next, the state estimation means $321b$ inputs the state information with the position-score correspondence information updated in step S5 and the position information of the current time of the mobile object input from the resolution control means 323, to the observed information reflection means $322b$.

The observed information reflection means $322b$ updates the position-score correspondence information included in the state information, using the state information and the position information of the mobile object input from the state estimation means $321b$ and the ID information of the current time input from the ID information input unit 2 (steps S6 and S7). This process of steps S6 and S7 may be the same as the process of steps S6 and S7 in Exemplary Embodiment 1. Note that, in step S6, the amount of score increase of the cell that partially overlaps the ID detection area may be the same as or smaller than the amount of score increase of the cell included in the ID detection area.

The state information obtained as a result of step S7 is the state information of the current time. The process up to step S7 is the process of creating the state information of the current time based on the state information of the previous time for one ID.

The state update means 32*b* thus completes the creation of the state information of the current time for the ID for which the process of steps S24, S5, S6, and S7 is performed.

After step S7, the state update means 32*b* returns to step S4, and determines whether or not there is any unprocessed state information with regard to steps S24, S5, S6, and S7.

In the case of determining that there is no unprocessed state information with regard to steps S24, S5, S6, and S7 (step S4: No), the observed information reflection means 322 stores the state information of the current time created for each ID by repeatedly performing the process of steps S24, S5, S6, and S7, in the state storage unit 31 (step S8).

Next, the flow line specification means 33 acquires state information of each ID for a past predetermined period from the current time from the state storage unit 31, and specifies a flow line (steps S9 to S16). The flow line creation procedure may be the same as the method of steps S9 to S16 in Exemplary Embodiment 1.

In Exemplary Embodiment 2, however, in step S13 there is a possibility that the resolution differs between the position-score correspondence information of the nearest time estimated based on the position-score correspondence information of the definite time and the position-score correspondence information in the indefinite state information of the time nearest the definite time. In such a case, the definite state reflection means 332 performs the process of step S14 in the following manner. In the following description, the position-score correspondence information in the indefinite state information is simply referred to as indefinite state information.

In the case where the resolution of the indefinite state information is coarser than the position-score correspondence information obtained in step S13, the definite state reflection means 332 specifies, among the cells of the position-score correspondence information obtained in step S13, cells over which one cell of the indefinite state information extends, and calculates a score mean value of these cells. The definite state reflection means 332 adds the mean value to the score of the cell of interest in the indefinite state information or multiplies the score by the mean value, to update the score of the cell of interest in the indefinite state information. The definite state reflection means 332 performs this process for each cell in the indefinite state information. When calculating the mean value, the definite state reflection means 332 may weight, among the cells of the position-score correspondence information obtained in step S13, the scores of the cells over which one cell of the indefinite state information extends, by an area ratio at which the cell of the indefinite state information extends over. The definite state reflection means 332 may then calculate a score mean value after the weighting, and add the mean value to the score of the cell of interest in the indefinite state information or multiply the score by the mean value.

Alternatively, the definite state reflection means 332 may specify, among the cells of the position-score correspondence information obtained in step S13, cells over which one cell of the indefinite state information extends, specify a maximum score of these cells, and add the maximum value to the score of the cell of interest in the indefinite state information or multiply the score by the maximum value.

In the case where the resolution of the indefinite state information is finer than that of the position-score correspondence information obtained in step S13, the definite state reflection means 332 may specify, among the cells of the position-score correspondence information obtained in step S13, a cell in which one cell of the indefinite state information is included, and add the score of the specified cell to the score of the cell of interest in the indefinite state information or multiply the score by the score of the specified cell. The definite state reflection means 322 may perform this process for each cell of the indefinite state information.

Steps S9 to S16 are the same as those in Exemplary Embodiment 1 on the other points.

In Exemplary Embodiment 2 as in Exemplary Embodiment 1, it is possible to specify the position of the mobile object for each ID and robustly determine the flow line.

Moreover, in Exemplary Embodiment 2, the resolution control means 323 controls the resolution of the position-score correspondence information created at each time, according to the closeness of the distance between the position coordinates of the mobile objects. This enables the flow line of each mobile object (i.e. each ID) to be specified with minimum necessary computational complexity.

Exemplary Embodiment 3

In Exemplary Embodiment 3, a peak score position is detected from position-score correspondence information of each time, and a position coordinate of a mobile object nearest the peak score position is specified based on position information input from the position information input unit 1, thereby determining a flow line.

Figure 23:
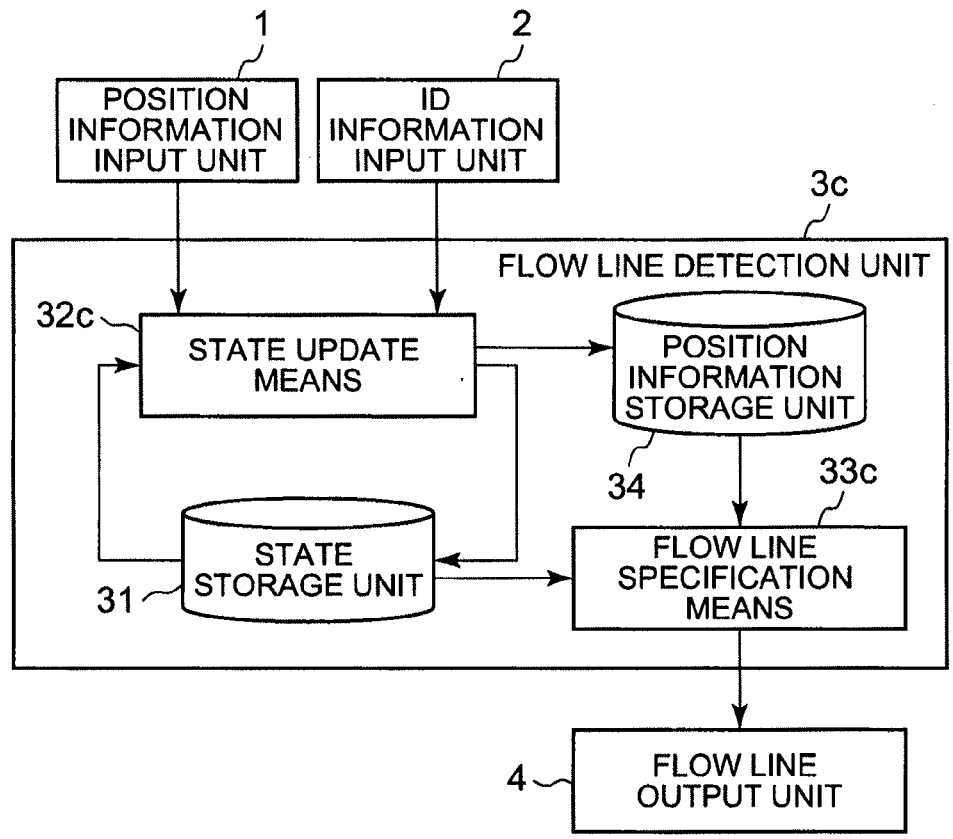
FIG. 23 is a block diagram showing an example of a flow line detection system in Exemplary Embodiment 3 of the present invention.

FIG. 23 is a block diagram showing an example of a flow line detection system in Exemplary Embodiment 3 of the present invention. The flow line detection system in Exemplary Embodiment 3 includes the position information input unit 1, the ID information input unit 2, a flow line detection unit 3*c*, and the flow line output unit 4. The position information input unit 1, the ID information input unit 2, and the flow line output unit 4 are the same as those in Exemplary Embodiment 1, and so their detailed description is omitted.

The flow line detection unit 3*c* includes state update means 32*c*, the state storage unit 31, flow line specification means 33*c*, and a position information storage unit 34. The state storage unit 31 is a storage device for storing state information of each time. The state storage unit 31 is the same as that in Exemplary Embodiment 1, and so its detailed description is omitted.

Figure 24:
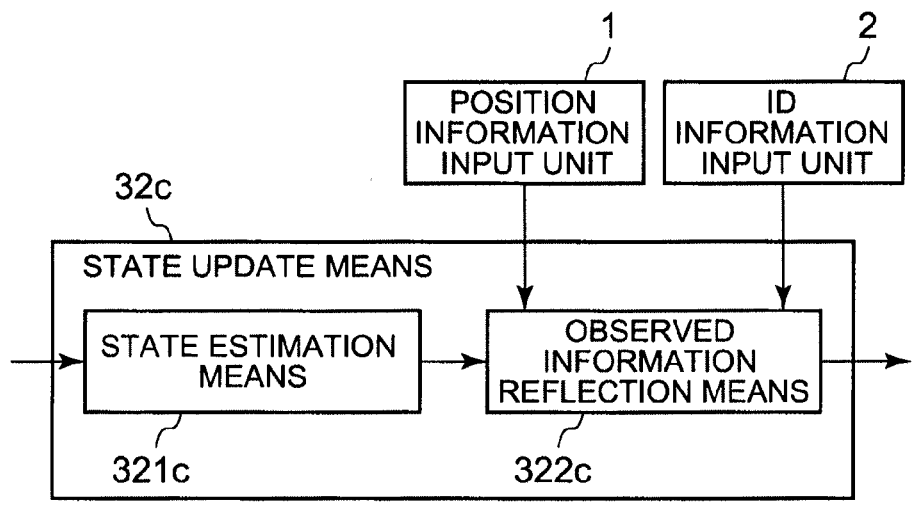
FIG. 24 is a block diagram showing an example of a structure of state update means in Exemplary Embodiment 3.

FIG. 24 is a block diagram showing an example of a structure of the state update means 32*c* in Exemplary Embodiment 3. The state update means 32*c* includes state estimation means 321*c* and observed information reflection means 322*c*. The state estimation means 321*c* propagates a score shown in position-score correspondence information included in state information of a previous time read from the state storage unit 31, according to a predetermined mobility model. The observed information reflection means 322*c* updates the position-score correspondence information after the score propagation process, based on position information input from the position information input unit 1 and ID information input from the ID information input unit 2. The state estimation means 321*c* and the observed information reflection means 322*c* are the same as the state estimation means 321 and the observed information reflection means 322 in Exemplary Embodiment 1, and their detailed description is omitted.

In this exemplary embodiment, for example the observed information reflection means 322*c* stores the position information input from the position information input unit 1 in the position information storage unit 34. The process of storing the position information in the position information storage unit 34 may be performed by the state estimation means 321*c*.

The ID information and the position information may be input to any of the state estimation means 321*c* and the observed information reflection means 322c so long as the state estimation means 321c and the observed information reflection means 322c can reference to the ID information and the position information, as in Exemplary Embodiment 1.

Figure 25:
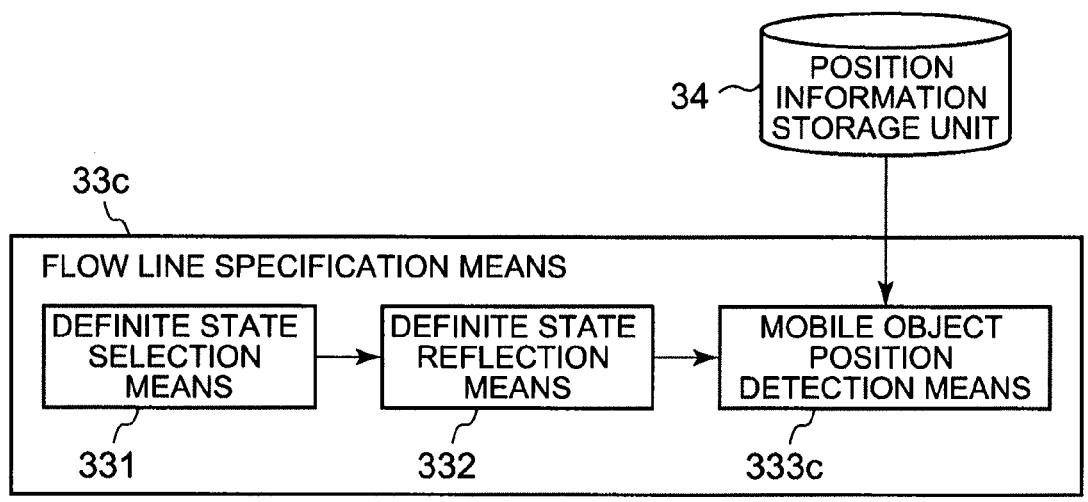
FIG. 25 is a block diagram showing an example of a structure of flow line specification means in Exemplary Embodiment 3.

FIG. 25 is a block diagram showing an example of a structure of the flow line specification means 33c in Exemplary Embodiment 3. The flow line specification means 33c includes the definite state selection means 331, the definite state reflection means 332, and mobile object position detection means 333c.

The definite state selection means 331 acquires state information of each ID created during a past predetermined period from the current time, from the state storage unit 31. The definite state selection means 331 extracts state information including an ID of a mobile object which is subjected to flow line derivation, from the acquired state information. The definite state selection means 331 selects state information of a definite time, from the state information of the ID at each time. The definite state reflection means 332, while tracing an indefinite time nearest the definite time, modifies the score shown in the position-score correspondence information of the indefinite time. The definite state selection means 331 and the definite state reflection means 332 are the same as those in Exemplary Embodiment 1, and so their description is omitted.

The mobile object position detection means 333c detects the position of the mobile object at each time, from the position-score correspondence information of each time processed by the definite state reflection means 332. In Exemplary Embodiment 3, the mobile object position detection means 333c not only detects, as the position of the mobile object, a position having a peak score, from the position-score correspondence information of each time, but also specifies a position nearest the position having the peak score among the position coordinates of the time corresponding to the position-score correspondence information. The mobile object position detection means 333c performs this process on the position-score correspondence information of each time. The mobile object position detection means 333c sets the position coordinates in a time series, as the flow line. The mobile object position detection means 333c then instructs the flow line output unit 4 to display the line formed by connecting the position coordinates in a time series, as the flow line.

In Exemplary Embodiment 3, the state update means 32c (the state estimation means 321c and the observed information reflection means 322c) and the flow line specification means 33c (the definite state selection means 331, the definite state reflection means 332, and the mobile object position detection means 333c) are realized, for example, by a CPU of a computer operating according to a flow line detection program. In this case, the flow line detection program may be stored in a program storage device (not shown) of the computer, with the CPU reading the program and, according to the program, operating as the state update means 32c (the state estimation means 321c and the observed information reflection means 322c) and the flow line specification means 33c (the definite state selection means 331, the definite state reflection means 332, and the mobile object position detection means 333c). The state update means 32c and the flow line specification means 33 may be each realized by separate hardware. The state estimation means 321c and the observed information reflection means 322c may be each realized by separate hardware. The definite state selection means 331, the definite state reflection means 332, and the mobile object position detection means 333c may be each realized by separate hardware.

Figure 26:
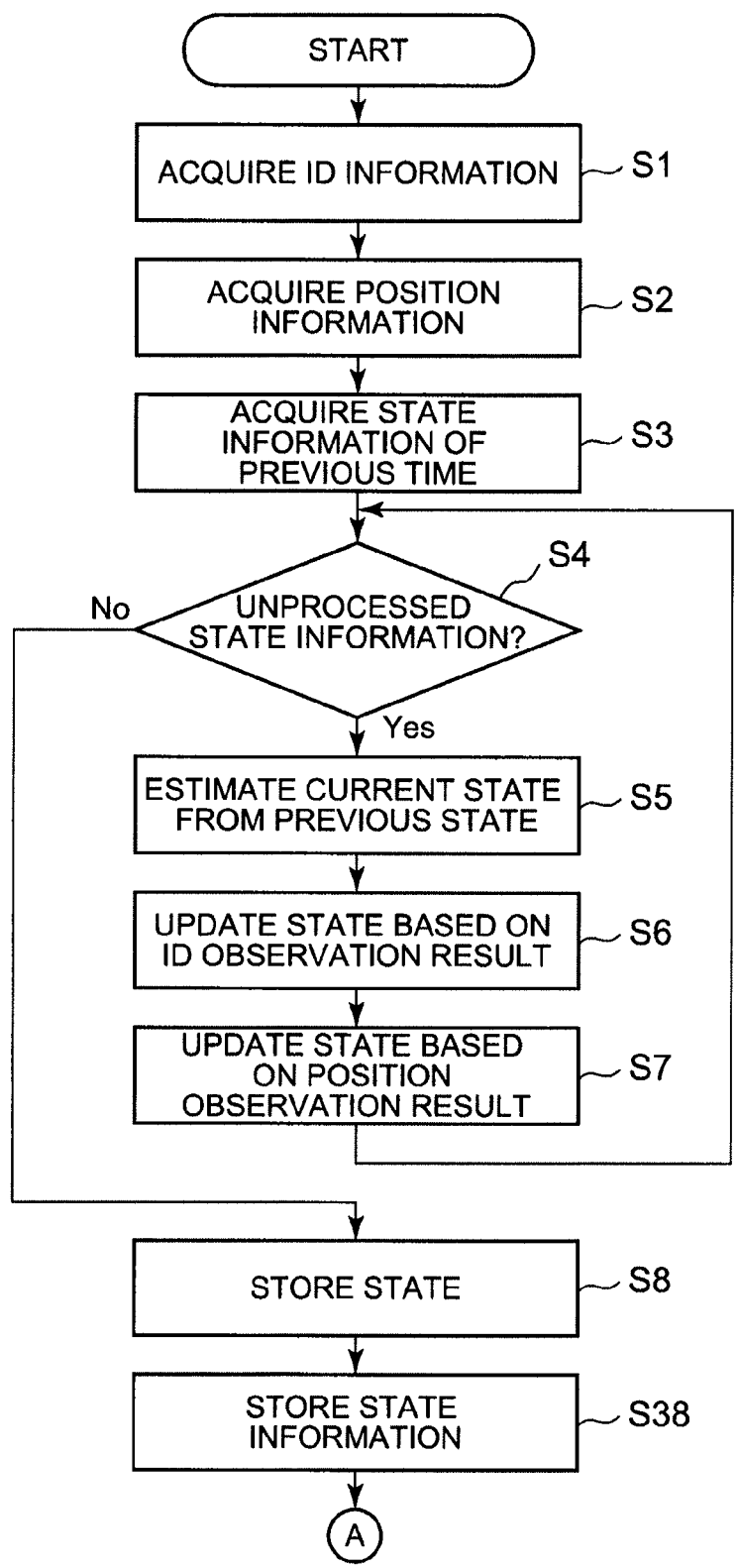
FIG. 26 is a flowchart showing an example of a process of the flow line detection unit in Exemplary Embodiment 3.
Figure 27:
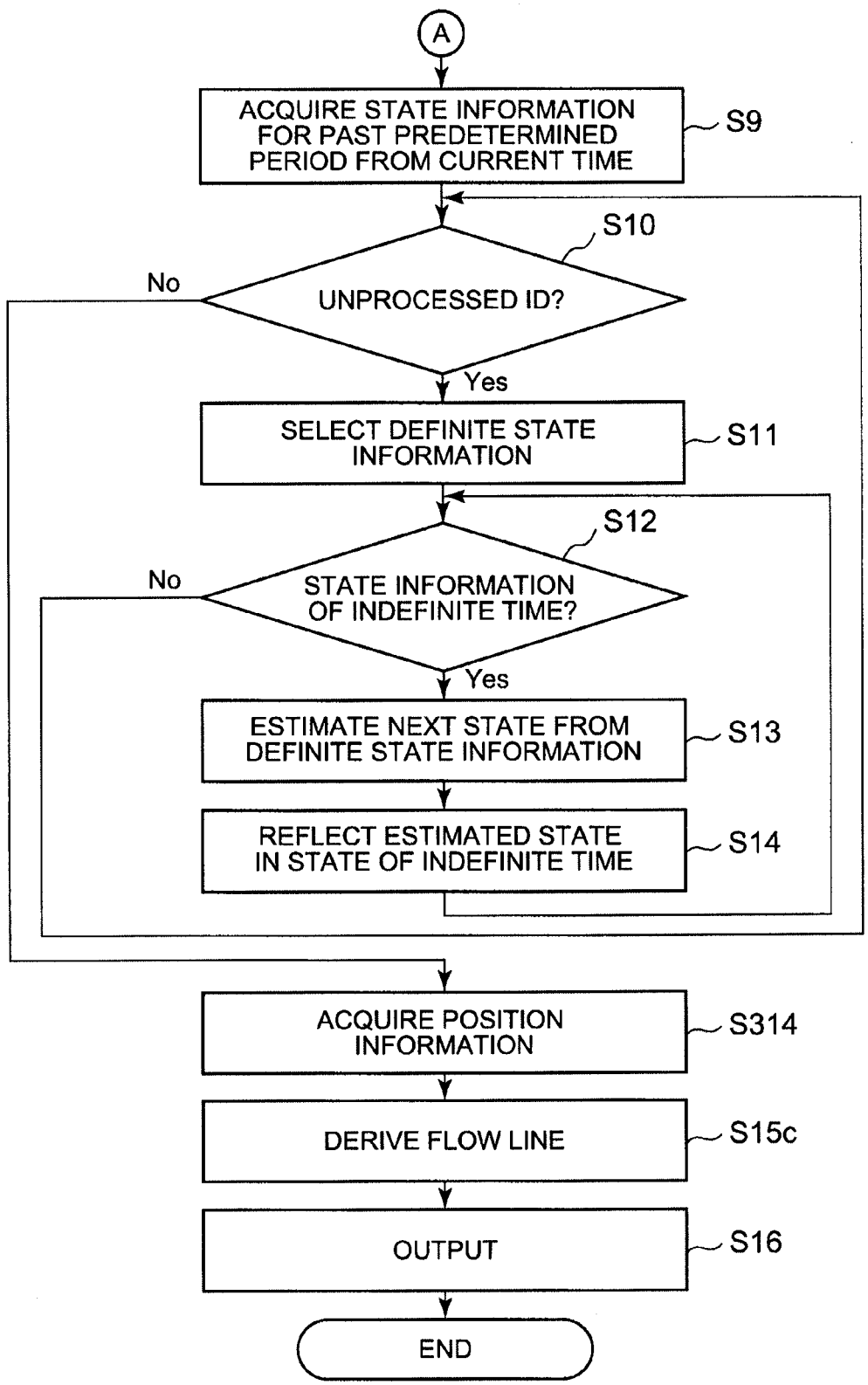
FIG. 27 is a flowchart showing an example of a process of the flow line detection unit in Exemplary Embodiment 3.

The following describes operations in Exemplary Embodiment 3. FIGS. 26 and 27 are flowcharts showing an example of the process of the flow line detection unit 3c in Exemplary Embodiment 3. In the flowcharts shown in FIGS. 26 and 27, the same processes as in Exemplary Embodiment 1 are given the same signs as in FIGS. 7 and 8, and their detailed description is omitted.

The process (steps S1 to S8) in which the state update means 32c creates the state information of the current time using the state information of the previous time and stores the created state information in the state storage unit 31 is the same as the process of steps S1 to S8 in Exemplary Embodiment 1.

The state update means 32c stores the position information (combination of the position coordinate of the mobile object and the detection time of the position coordinate) acquired from the position information input unit 1 in step S2, in the position information storage unit 34 (step S38).

Following this, the flow line specification means 33c performs a process of reading state information for a past predetermined period from the current time from the state storage unit 31, selecting definite state information, estimating a score of a nearest indefinite time based on a score indicated by the definite state information, and reflecting the estimated score on indefinite state information of the time (steps S9 to S14). When, among the state information read from the state storage unit 31, there is no more state information on which the process of steps S11 to S14 is not performed (step S10: No), the flow line specification means 33c goes to step S314. At this point, the score of the state information of the definite time has been reflected in the state information of the indefinite time in sequence.

In step S314, the mobile object position detection means 333c reads the position information for a past predetermined period from the current time, from the position information storage unit 34 (step S314). The past predetermined period mentioned here is the same as the time width when the definite state selection means 331 reads the state information for the past predetermined period from the current time in step S9.

Furthermore, the mobile object position detection means 333c specifies the flow line for each ID, using the state information of each time and the position information acquired in step S314 (step S15c). In Exemplary Embodiment 3, the mobile object position detection means 333c selects each mobile object ID in sequence. The mobile object position detection means 333c references to position-score correspondence information included in state information of the selected ID at each time, and detects a cell having a peak score at each time. The mobile object position detection means 333c also specifies a position coordinate nearest the detected cell (i.e. cell having a peak score), among position coordinates included in position information of the time corresponding to the position-score correspondence information of the detected cell. The mobile object position detection means 333c determines that the mobile object exists at the position coordinate at the time. For the selected ID, the mobile object position detection means 333c equally specifies a coordinate nearest a cell having a peak score, for each time. Arranging the specified coordinates in a time series yields information indicating the flow line. Once the position coordinate at each time is specified for one ID, the mobile object position detection means 333c selects the next ID, and specifies a position coordinate at each time. As a result of the mobile object position detection means 333c selecting an ID and repeating the same process, the flow line of each ID is calculated.

Once the mobile object position detection means 333c specifies the position coordinate of each time for each ID, the mobile object position detection means 333c instructs the flow line output unit 4 to display the flow line obtained by connecting the position coordinates in a time series (step S16).

In Exemplary Embodiment 3 as in Exemplary Embodiment 1, it is possible to specify the position of the mobile object for each ID and robustly determine the flow line.

Moreover, in Exemplary Embodiment 3, the resolution of the created flow line does not depend on the resolution of the position-score correspondence information, and therefore a fine traffic line can be created even when the resolution is a necessary minimum resolution at which the mobile objects can be separated.

The following describes a modification of Exemplary Embodiment 3. Exemplary Embodiment 3 and Exemplary Embodiment 2 may be combined so that the state update means includes the resolution control means in addition to the state estimation means and the observed information reflection means. In this case, the advantageous effects of Exemplary Embodiment 2 and the advantageous effects of Exemplary Embodiment 3 can both be achieved.

Figure 28:
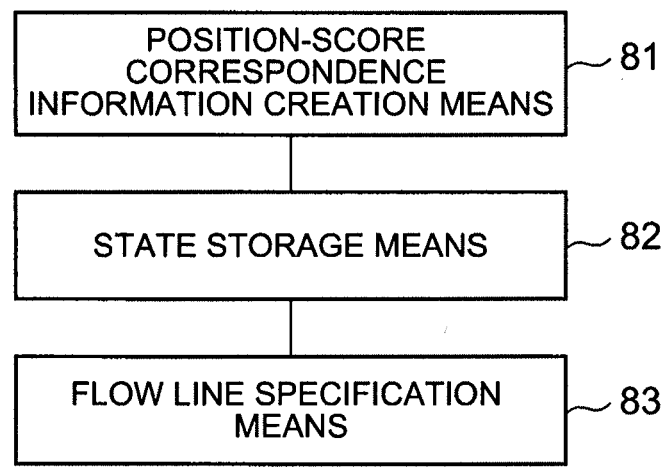
FIG. 28 is a block diagram showing an example of a minimum structure of a flow line detection system according to the present invention.

The following describes a minimum structure according to the present invention. FIG. 28 is a block diagram showing an example of a minimum structure of a flow line detection system according to the present invention. The flow line detection system according to the present invention includes position-score correspondence information creation means 81, state storage means 82, and flow line specification means 83.

The position-score correspondence information creation means 81 (e.g. the state update means 32) creates position-score correspondence information for each piece of mobile object identification information, the position-score correspondence information being information in which a score indicating a level of possibility that a mobile object having a unique piece of identification information exists is set for each position (e.g. each cell) in a tracking area of the mobile object.

The state storage means 82 (e.g. the state storage unit 31) stores position-score correspondence information of each time.

The flow line specification means 83 (e.g. the flow line specification means 33): selects, for each piece of mobile object identification information, position-score correspondence information that satisfies a predetermined criterion from among the position-score correspondence information stored in the state storage means, as definite position-score correspondence information; repeatedly performs a process of reflecting the definite position-score correspondence information in position-score correspondence information of a time nearest a time corresponding to the definite position-score correspondence information and setting the position-score correspondence information of the nearest time as definite position-score correspondence information; and specifies a flow line of a mobile object from a score in position-score correspondence information of each time.

According to such a structure, it is possible to accurately determine a position of a mobile object of each piece of identification information and detect a flow line even when there are frequent cases where a position or identification information of a mobile object cannot be detected.

The above exemplary embodiments may be partly or wholly described in the following supplementary notes, though the present invention is not limited to such.

(Supplementary note 1) A flow line detection system comprising: position-score correspondence information creation means for creating position-score correspondence information for each piece of mobile object identification information, the position-score correspondence information being information in which a score indicating a level of possibility that a mobile object having a unique piece of identification information exists is set for each position in a tracking area of the mobile object; state storage means for storing position-score correspondence information of each time; and flow line specification means for: selecting, for each piece of mobile object identification information, position-score correspondence information that satisfies a predetermined criterion from among the position-score correspondence information stored in the state storage means, as definite position-score correspondence information; repeatedly performing a process of reflecting the definite position-score correspondence information in position-score correspondence information of a time nearest a time corresponding to the definite position-score correspondence information and setting the position-score correspondence information of the nearest time as definite position-score correspondence information; and specifying a flow line of a mobile object from a score in position-score correspondence information of each time.

(Supplementary note 2) The flow line detection system according to supplementary note 1, wherein the position-score correspondence information creation means includes: score propagation means for propagating, according to a predetermined score propagation mode, a score of each position in position-score correspondence information created at a time preceding a current time, as a score of a neighboring position; and observed information reflection means for updating the score in the position-score correspondence information in which the score is propagated by the score propagation means, based on a detection area where a piece of identification information is detected at the current time and a position coordinate of a mobile object detected at the current time, to create position-score correspondence information of the current time.

(Supplementary note 3) The flow line detection system according to supplementary note 1, wherein the position-score correspondence information creation means includes: resolution control means for: determining each individual area in the tracking area to which a score is to be assigned, based on a distance between position coordinates of mobile objects detected at a current time; and creating position-score correspondence information in which the score is set for each individual area, based on a score in position-score correspondence information created at a time preceding the current time; score propagation means for propagating, according to a predetermined score propagation mode, each score in the position-score correspondence information created by the resolution control means, as a score of a neighboring position; and observed information reflection means for updating the score in the position-score correspondence information in which the score is propagated by the score propagation means, based on a detection area where a piece of identification information is detected at the current time and a position coordinate of a mobile object detected at the current time, to create position-score correspondence information of the current time.

(Supplementary note 4) The flow line detection system according to any one of supplementary notes 1 to 3, wherein the observed information reflection means includes: definite information selection means for selecting, for each piece of mobile object identification information, the position-score correspondence information that satisfies the predetermined criterion from among the position-score correspondence information stored in the state storage means, as the definite position-score correspondence information; score reflection means for repeatedly performing a process of propagating each score in the definite position-score correspondence information as a score of a neighboring position according to a predetermined score propagation mode, reflecting each score in the definite position-score correspondence information after the score propagation in a corresponding score in position-score correspondence information of a time nearest a time corresponding to the definite position-score correspondence information, and setting the position-score correspondence information of the nearest time as definite position-score correspondence information; and mobile object position specification means for specifying the flow line of the mobile object, by specifying a position of the mobile object of each time from a score in definite position-score correspondence information of each time.

(Supplementary note 5) The flow line detection system according to supplementary note 4, wherein the mobile object position specification means specifies the position of the mobile object of each time, based on a position having a peak score in the definite position-score correspondence information of each time.

(Supplementary note 6) The flow line detection system according to supplementary note 4, comprising position information storage means for storing a position coordinate of a mobile object detected at each time, wherein the mobile object position specification means specifies a position having a peak score in the definite position-score correspondence information of an individual time, and specifies, as the position of the mobile object, a position coordinate nearest the position having the peak score from among a position coordinate of the mobile object detected at a time same as the time.

(Supplementary note 7) A flow line detection method comprising: a position-score correspondence information creation step of creating position-score correspondence information for each piece of mobile object identification information, the position-score correspondence information being information in which a score indicating a level of possibility that a mobile object having a unique piece of identification information exists is set for each position in a tracking area of the mobile object; a state storage step of storing position-score correspondence information of each time in state storage means; and a flow line specification step of selecting, for each piece of mobile object identification information, position-score correspondence information that satisfies a predetermined criterion from among the position-score correspondence information stored in the state storage means as definite position-score correspondence information, repeatedly performing a process of reflecting the definite position-score correspondence information in position-score correspondence information of a time nearest a time corresponding to the definite position-score correspondence information and setting the position-score correspondence information of the nearest time as definite position-score correspondence information, and specifying a flow line of a mobile object from a score in position-score correspondence information of each time.

(Supplementary note 8) The flow line detection method according to supplementary note 7, wherein the position-score correspondence information creation step includes: a score propagation step of propagating, according to a predetermined score propagation mode, a score of each position in position-score correspondence information created at a time preceding a current time, as a score of a neighboring position; and an observed information reflection step of updating the score in the position-score correspondence information in which the score is propagated in the score propagation step, based on a detection area where a piece of identification information is detected at the current time and a position coordinate of a mobile object detected at the current time, to create position-score correspondence information of the current time.

(Supplementary note 9) The flow line detection method according to supplementary note 7, wherein the position-score correspondence information creation step includes: a resolution control step of: determining each individual area in the tracking area to which a score is to be assigned, based on a distance between position coordinates of mobile objects detected at a current time; and creating position-score correspondence information in which the score is set for each individual area, based on a score in position-score correspondence information created at a time preceding the current time; a score propagation step of propagating, according to a predetermined score propagation mode, each score in the position-score correspondence information created in the resolution control step, as a score of a neighboring position; and an observed information reflection step of updating the score in the position-score correspondence information in which the score is propagated in the score propagation step, based on a detection area where a piece of identification information is detected at the current time and a position coordinate of a mobile object detected at the current time, to create position-score correspondence information of the current time.

(Supplementary note 10) The flow line detection method according to any one of supplementary notes 7 to 9, wherein the observed information reflection step includes: a definite information selection step of selecting, for each piece of mobile object identification information, the position-score correspondence information that satisfies the predetermined criterion from among the position-score correspondence information stored in the state storage means, as the definite position-score correspondence information; a score reflection step of repeatedly performing a process of propagating each score in the definite position-score correspondence information as a score of a neighboring position according to a predetermined score propagation mode, reflecting each score in the definite position-score correspondence information after the score propagation in a corresponding score in position-score correspondence information of a time nearest a time corresponding to the definite position-score correspondence information, and setting the position-score correspondence information of the nearest time as definite position-score correspondence information; and a mobile object position specification step of specifying the flow line of the mobile object, by specifying a position of the mobile object of each time from a score in definite position-score correspondence information of each time.

(Supplementary note 11) The flow line detection method according to supplementary note 10, wherein the mobile object position specification step specifies the position of the mobile object of each time, based on a position having a peak score in the definite position-score correspondence information of each time.

(Supplementary note 12) The flow line detection method according to supplementary note 10, comprising a position information storage step of storing a position coordinate of a mobile object detected at each time in position information storage means, wherein the mobile object position specification step specifies a position having a peak score in the definite position-score correspondence information of an individual time, and specifies, as the position of the mobile object, a position coordinate nearest the position having the peak score from among a position coordinate of the mobile object detected at a time same as the time.

(Supplementary note 13) A flow line detection program for causing a computer to execute: a position-score correspondence information creation process of creating position-score correspondence information for each piece of mobile object identification information, the position-score correspondence information being information in which a score indicating a level of possibility that a mobile object having a unique piece of identification information exists is set for each position in a tracking area of the mobile object; a state storage process of storing position-score correspondence information of each time in state storage means; and a flow line specification process of: selecting, for each piece of mobile object identification information, position-score correspondence information that satisfies a predetermined criterion from among the position-score correspondence information stored in the state storage means, as definite position-score correspondence information; repeatedly performing a process of reflecting the definite position-score correspondence information in position-score correspondence information of a time nearest a time corresponding to the definite position-score correspondence information and setting the position-score correspondence information of the nearest time as definite position-score correspondence information; and specifying a flow line of a mobile object from a score in position-score correspondence information of each time.

(Supplementary note 14) The flow line detection program according to supplementary note 13, causing the computer to execute, in the position-score correspondence information creation process: a score propagation process of propagating, according to a predetermined score propagation mode, a score of each position in position-score correspondence information created at a time preceding a current time, as a score of a neighboring position; and an observed information reflection process of updating the score in the position-score correspondence information in which the score is propagated in the score propagation process, based on a detection area where a piece of identification information is detected at the current time and a position coordinate of a mobile object detected at the current time, to create position-score correspondence information of the current time.

(Supplementary note 15) The flow line detection program according to supplementary note 13, causing the computer to execute, in the position-score correspondence information creation process: a resolution control process of: determining each individual area in the tracking area to which a score is to be assigned, based on a distance between position coordinates of mobile objects detected at a current time; and creating position-score correspondence information in which the score is set for each individual area, based on a score in position-score correspondence information created at a time preceding the current time; a score propagation process of propagating, according to a predetermined score propagation mode, each score in the position-score correspondence information created in the resolution control process, as a score of a neighboring position; and an observed information reflection process of updating the score in the position-score correspondence information in which the score is propagated in the score propagation process, based on a detection area where a piece of identification information is detected at the current time and a position coordinate of a mobile object detected at the current time, to create position-score correspondence information of the current time.

(Supplementary note 16) The flow line detection program according to any one of supplementary notes 13 to 15, causing the computer to execute, in the observed information reflection process: a definite information selection process of selecting, for each piece of mobile object identification information, the position-score correspondence information that satisfies the predetermined criterion from among the position-score correspondence information stored in the state storage means, as the definite position-score correspondence information; a score reflection process of repeatedly performing a process of propagating each score in the definite position-score correspondence information as a score of a neighboring position according to a predetermined score propagation mode, reflecting each score in the definite position-score correspondence information after the score propagation in a corresponding score in position-score correspondence information of a time nearest a time corresponding to the definite position-score correspondence information, and setting the position-score correspondence information of the nearest time as definite position-score correspondence information; and a mobile object position specification process of specifying the flow line of the mobile object, by specifying a position of the mobile object of each time from a score in definite position-score correspondence information of each time.

(Supplementary note 17) The flow line detection program according to supplementary note 16, causing the computer to execute, in the mobile object position specification process, specifying the position of the mobile object of each time, based on a position having a peak score in the definite position-score correspondence information of each time.

(Supplementary note 18) The flow line detection program according to supplementary note 16, causing the computer to execute a position information storage process of storing a position coordinate of a mobile object detected at each time in position information storage means and, in the mobile object position specification process, specifying a position having a peak score in the definite position-score correspondence information of an individual time, and specifies, as the position of the mobile object, a position coordinate nearest the position having the peak score from among a position coordinate of the mobile object detected at a time same as the time.

(Supplementary note 19) A flow line detection system comprising: a position-score correspondence information creation unit for creating position-score correspondence information for each piece of mobile object identification information, the position-score correspondence information being information in which a score indicating a level of possibility that a mobile object having a unique piece of identification information exists is set for each position in a tracking area of the mobile object; a state storage unit for storing position-score correspondence information of each time; and a flow line specification unit for: selecting, for each piece of mobile object identification information, position-score correspondence information that satisfies a predetermined criterion from among the position-score correspondence information stored in the state storage unit, as definite position-score correspondence information; repeatedly performing a process of reflecting the definite position-score correspondence information in position-score correspondence information of a time nearest a time corresponding to the definite position-score correspondence information and setting the position-score correspondence information of the nearest time as definite position-score correspondence information; and specifying a flow line of a mobile object from a score in position-score correspondence information of each time.

(Supplementary note 20) The flow line detection system according to supplementary note 19, wherein the position-score correspondence information creation unit includes: a score propagation unit for propagating, according to a predetermined score propagation mode, a score of each position in position-score correspondence information created at a time preceding a current time, as a score of a neighboring position; and an observed information reflection unit for updating the score in the position-score correspondence information in which the score is propagated by the score propagation unit, based on a detection area where a piece of identification information is detected at the current time and a position coordinate of a mobile object detected at the current time, to create position-score correspondence information of the current time.

(Supplementary note 21) The flow line detection system according to supplementary note 19, wherein the position-score correspondence information creation unit includes: a resolution control unit for: determining each individual area in the tracking area to which a score is to be assigned, based on a distance between position coordinates of mobile objects detected at a current time; and creating position-score correspondence information in which the score is set for each individual area, based on a score in position-score correspondence information created at a time preceding the current time; a score propagation unit for propagating, according to a predetermined score propagation mode, each score in the position-score correspondence information created by the resolution control unit, as a score of a neighboring position; and an observed information reflection unit for updating the score in the position-score correspondence information in which the score is propagated by the score propagation unit, based on a detection area where a piece of identification information is detected at the current time and a position coordinate of a mobile object detected at the current time, to create position-score correspondence information of the current time.

(Supplementary note 22) The flow line detection system according to any one of supplementary notes 19 to 21, wherein the observed information reflection unit includes: a definite information selection unit for selecting, for each piece of mobile object identification information, the position-score correspondence information that satisfies the predetermined criterion from among the position-score correspondence information stored in the state storage means, as the definite position-score correspondence information; a score reflection unit for repeatedly performing a process of propagating each score in the definite position-score correspondence information as a score of a neighboring position according to a predetermined score propagation mode, reflecting each score in the definite position-score correspondence information after the score propagation in a corresponding score in position-score correspondence information of a time nearest a time corresponding to the definite position-score correspondence information, and setting the position-score correspondence information of the nearest time as definite position-score correspondence information; and a mobile object position specification unit for specifying the flow line of the mobile object, by specifying a position of the mobile object of each time from a score in definite position-score correspondence information of each time.

(Supplementary note 23) The flow line detection system according to supplementary note 22, wherein the mobile object position specification unit specifies the position of the mobile object of each time, based on a position having a peak score in the definite position-score correspondence information of each time.

(Supplementary note 24) The flow line detection system according to supplementary note 22, comprising a position information storage unit for storing a position coordinate of a mobile object detected at each time, wherein the mobile object position specification unit specifies a position having a peak score in the definite position-score correspondence information of an individual time, and specifies, as the position of the mobile object, a position coordinate nearest the position having the peak score from among a position coordinate of the mobile object detected at a time same as the time.

This application claims priority based on Japanese Patent Application No. 2010-125079 filed on May 31, 2010, the disclosure of which is incorporated herein in its entirety.

Though the present invention has been described with reference to the above exemplary embodiments, the present invention is not limited to the above exemplary embodiments. Various changes understandable by those skilled in the art within the scope of the present invention can be made to the structures and details of the present invention.

Industrial Applicability

The present invention is favorably applied to a flow line detection system that associates a mobile object with an ID and specifies a flow line of the mobile object.

The present invention is applicable to security usage where, in the case of performing flow line detection by associating a position of each person working in an office or a factory with an employee number unique to the person, whether or not entry into an area is permitted is determined according to security permission for each person based on obtained flow lines, and alert control is exercised when necessary.

The present invention is also applicable to marketing usage where, in the case of performing flow line detection by associating a position of each person shopping in a shopping center with a membership number unique to the person, flow lines of customers are measured.

REFERENCE SIGNS LIST 1 position information input unit
2 ID information input unit
3 flow line detection unit
4 flow line output unit
31 state storage unit
32 state update means
33 flow line specification means
321 state estimation means
322 observed information reflection means
323 resolution control means
331 definite state selection means
332 definite state reflection means
333 mobile object position detection means

The invention claimed is:

1. A flow line detection system comprising:
a position-score correspondence information creation unit implemented at least by hardware including a processor and that is for creating position-score correspondence information for each piece of mobile object identification information, the position-score correspondence information being information in which a score indicating a level of possibility that a mobile object having a unique piece of identification information exists is set for each position in a tracking area of the mobile object;
a state storage unit for storing position-score correspondence information of each detection time of a position coordinate of the mobile object and the mobile object identification information; and
a flow line specification unit implemented at least by hardware including a processor and that is for: selecting, for each piece of mobile object identification information, position-score correspondence information that satisfies a criterion from among the position-score correspondence information stored in the state storage unit, as definite position-score correspondence information; repeatedly performing a process of reflecting the definite position-score correspondence information in position-score correspondence information of a detection time nearest a detection time corresponding to the definite position-score correspondence information and setting the position-score correspondence information of the nearest detection time as definite position-score correspondence information; and specifying a flow line of the mobile object from the score in position-score correspondence information of each detection time.

2. The flow line detection system according to claim 1, wherein the position-score correspondence information creation unit includes:
- a score propagation unit implemented at least by hardware including a processor and that is for propagating, according to a score propagation mode, the score of each position in position-score correspondence information created at a detection time preceding a current detection time, as a score of a neighboring position; and
- an observed information reflection unit implemented at least by hardware including a processor and that is for updating the score in the position-score correspondence information in which the score is propagated by the score propagation unit, based on a detection area where a piece of identification information is detected at the current detection time and the position coordinate of the mobile object detected at the current detection time, to create position-score correspondence information of the current detection time.

3. The flow line detection system according to claim 1, wherein the position-score correspondence information creation unit includes:
- a resolution control unit implemented at least by hardware including a processor and that is for: determining each individual area in the tracking area to which the score is to be assigned, based on a distance between position coordinates of mobile objects detected at a current detection time; and creating position-score correspondence information in which the score is set for each individual area, based on the score in position-score correspondence information created at a detection time preceding the current detection time;
- a score propagation unit implemented at least by hardware including a processor and that is for propagating, according to a score propagation mode, each score in the position-score correspondence information created by the resolution control unit, as a score of a neighboring position; and
- an observed information reflection unit implemented at least by hardware including a processor and that is for updating the score in the position-score correspondence information in which the score is propagated by the score propagation unit, based on a detection area where a piece of identification information is detected at the current detection time and a position coordinate of the mobile object detected at the current detection time, to create position-score correspondence information of the current detection time.

4. The flow line detection system according to claim 1, wherein the flow line specification unit includes:
- a definite information selection unit implemented at least by hardware including a processor and that is for selecting, for each piece of mobile object identification information, the position-score correspondence information that satisfies the criterion from among the position-score correspondence information stored in the state storage unit, as the definite position-score correspondence information;
- a score reflection unit implemented at least by hardware including a processor and that is for repeatedly performing a process of propagating each score in the definite position-score correspondence information as a score of a neighboring position according to a predetermined score propagation mode, reflecting each score in the definite position-score correspondence information after the score propagation in each score in position-score correspondence information of the detection time nearest the detection time corresponding to the definite position-score correspondence information, and setting the position-score correspondence information of the nearest detection time as definite position-score correspondence information; and
- a mobile object position specification unit implemented at least by hardware including a processor and that is for specifying the flow line of the mobile object, by specifying a position of the mobile object of each detection time from a score in definite position-score correspondence information of each detection time.

5. The flow line detection system according to claim 4, wherein the mobile object position specification unit specifies the position of the mobile object of each detection time, based on a position having a peak score in the definite position-score correspondence information of each detection time.

6. The flow line detection system according to claim 4, comprising
- a position information storage unit for storing a position coordinate of a mobile object detected at each detection time,
- wherein the mobile object position specification unit specifies a position having a peak score in the definite position-score correspondence information of an individual detection time, and specifies, as the position of the mobile object, a position coordinate nearest the position having the peak score from among a position coordinate of the mobile object detected at a detection time same as the individual detection time.

7. A flow line detection method, implemented by a processor, comprising:
- creating position-score correspondence information for each piece of mobile object identification information, the position-score correspondence information being information in which a score indicating a level of possibility that a mobile object having a unique piece of identification information exists is set for each position in a tracking area of the mobile object;
- storing position-score correspondence information of each detection time of a position coordinate of the mobile object and the mobile object identification information in a state storage unit; and
- selecting, for each piece of mobile object identification information, position-score correspondence information that satisfies a criterion from among the position-score correspondence information stored in the state storage unit as definite position-score correspondence information, repeatedly performing a process of reflecting the definite position-score correspondence information in position-score correspondence information of a detection time nearest a detection time corresponding to the definite position-score correspondence information and setting the position-score correspondence information of the nearest detection time as definite position-score correspondence information, and specifying a flow line of the mobile object from the score in position-score correspondence information of each detection time.

8. A non-transitory computer readable information recording medium storing a flow line detection program, when executed by a processor, performs a method for:

creating position-score correspondence information for each piece of mobile object identification information, the position-score correspondence information being information in which a score indicating a level of possibility that a mobile object having a unique piece of identification information exists is set for each position in a tracking area of the mobile object;

storing position-score correspondence information of each detection time of a position coordinate of the mobile object and the mobile object identification information in a state storage unit; and selecting, for each piece of mobile object identification information, position-score correspondence information that satisfies a criterion from among the position-score correspondence information stored in the state storage unit, as definite position-score correspondence information; repeatedly performing a process of reflecting the definite position-score correspondence information in position-score correspondence information of a detection time nearest a detection time corresponding to the definite position-score correspondence information and setting the position-score correspondence information of the nearest detection time as definite position-score correspondence information; and specifying a flow line of the mobile object from the score in position-score correspondence information of each detection time.

* * * * *

UNITED STATES PATENT AND TRADEMARK OFFICE
CERTIFICATE OF CORRECTION

PATENT NO. : 8,731,829 B2  
APPLICATION NO. : 13/695489  
DATED : May 20, 2014  
INVENTOR(S) : Yukie Moriguchi and Yuusuke Konishi Page 1 of 1

It is certified that error appears in the above-identified patent and that said Letters Patent is hereby corrected as shown below:

In the Specification

Column 3, Line 30: Delete "MD" and insert -- RFID --

In the Claims

Column 47, Line 20, Claim 2, before "score propagation mode" insert -- predetermined --

Column 47, Line 49, Claim 3, before "score propagation mode" insert -- predetermined --

Signed and Sealed this
Fourteenth Day of October, 2014

Michelle K. Lee
*Deputy Director of the United States Patent and Trademark Office*